(12) United States Patent
Konno et al.

(10) Patent No.: US 12,344,908 B2
(45) Date of Patent: Jul. 1, 2025

(54) HOT STAMPED BODY AND METHOD FOR PRODUCING SAME AND AL-PLATED STEEL SHEET

(71) Applicant: NIPPON STEEL CORPORATION, Tokyo (JP)

(72) Inventors: Michiko Konno, Tokyo (JP); Jun Maki, Tokyo (JP); Shinichi Yamaguchi, Tokyo (JP); Soshi Fujita, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 477 days.

(21) Appl. No.: 17/914,389

(22) PCT Filed: May 18, 2020

(86) PCT No.: PCT/JP2020/019682
§ 371 (c)(1),
(2) Date: Sep. 26, 2022

(87) PCT Pub. No.: WO2021/234790
PCT Pub. Date: Nov. 25, 2021

(65) Prior Publication Data
US 2023/0116894 A1    Apr. 13, 2023

(51) Int. Cl.
*C21D 8/02*      (2006.01)
*C21D 9/46*      (2006.01)
(Continued)

(52) U.S. Cl.
CPC ............. *C21D 8/0252* (2013.01); *C21D 9/46* (2013.01); *C22C 38/04* (2013.01); *C22C 38/06* (2013.01);
(Continued)

(58) Field of Classification Search
CPC ...... B32B 15/012; C21D 8/0252; C21D 9/46; C22C 38/002; C22C 38/02; C22C 38/04;
(Continued)

(56) References Cited

U.S. PATENT DOCUMENTS

2007/0141246 A1    6/2007  Le Craz
2012/0328871 A1    12/2012  Rout et al.
(Continued)

FOREIGN PATENT DOCUMENTS

JP    2007-514865 A    6/2007
JP    2008-127638 A    6/2008
(Continued)

*Primary Examiner* — Jenny R Wu
(74) *Attorney, Agent, or Firm* — Birch, Stewart, Kolasch & Birch, LLP

(57) ABSTRACT

Provided is a hot stamped body comprising a steel base material, an Al-plating layer formed on at least one surface of the steel base material, a coating formed on the Al-plating layer and containing ZnO particles and $CeO_2$ particles having an average particle size smaller than an average particle size of the ZnO particles, and a Zn- and Al-containing complex oxide layer formed between the Al-plating layer and the coating. Further, provided is a method for producing a hot stamped body comprising forming an Al-plating layer on at least one side of a steel sheet, coating a surface of the Al-plating layer with an aqueous solution containing ZnO particles and $CeO_2$ particles, then heating it to form a coating containing ZnO particles and $CeO_2$ particles on the Al-plating layer, and hot pressing the steel sheet. Further, provided is an Al-plated steel sheet comprising a steel base material, an Al-plating layer formed on at least one surface of the steel base material, and a coating formed on the Al-plating layer and containing ZnO particles and $CeO_2$ particles having an average particle size smaller than an average particle size of the ZnO particles.

16 Claims, 4 Drawing Sheets

(51) Int. Cl.
    *C22C 38/04*     (2006.01)
    *C22C 38/06*     (2006.01)
    *C22C 38/42*     (2006.01)
    *C22C 38/44*     (2006.01)
    *C22C 38/50*     (2006.01)
    *C22C 38/54*     (2006.01)
    *C23C 2/26*     (2006.01)
    *C23C 28/00*     (2006.01)

(52) U.S. Cl.
    CPC .............. *C22C 38/42* (2013.01); *C22C 38/44* (2013.01); *C22C 38/50* (2013.01); *C22C 38/54* (2013.01); *C23C 2/26* (2013.01); *C23C 28/32* (2013.01); *C23C 28/345* (2013.01)

(58) Field of Classification Search
    CPC ......... C22C 38/06; C22C 38/08; C22C 38/12; C22C 38/14; C22C 38/16; C22C 38/32; C22C 38/34; C22C 38/38; C22C 38/42; C22C 38/44; C22C 38/50; C22C 38/54; C23C 2/12; C23C 2/26; C23C 2/40; C23C 28/30; C23C 28/32; C23C 28/321; C23C 28/322; C23C 28/345

See application file for complete search history.

(56) References Cited

U.S. PATENT DOCUMENTS

| | | |
|---|---|---|
| 2015/0044499 A1 | 2/2015 | Maki et al. |
| 2018/0079174 A1 | 3/2018 | Kawamura et al. |
| 2018/0171164 A1 | 6/2018 | Fujita et al. |

FOREIGN PATENT DOCUMENTS

| | | |
|---|---|---|
| JP | 2013-519793 A | 5/2013 |
| WO | WO 2013/157522 A1 | 10/2013 |
| WO | WO 2016/159307 A1 | 10/2016 |
| WO | WO 2016/195101 A1 | 12/2016 |

HOT STAMPED BODY AND METHOD FOR PRODUCING SAME AND AL-PLATED STEEL SHEET

FIELD

The present invention relates to a hot stamped body and a method for producing the same and to an Al-plated steel sheet, more particularly relates to a hot stamped body including Al plating and excellent in corrosion resistance after coating and a method for producing the same and to an Al-plated steel sheet suitable for producing the hot stamped body.

BACKGROUND

As the technique for press-forming a material which is hard to shape such as high strength steel sheet, hot stamping (hot pressing) is known. Hot stamping is a technique for hot shaping which shapes a material supplied for shaping after heating it. In this technique, the material is shaped after being heated, therefore at the time of shaping, the steel material is soft and has excellent shapeability. Therefore, even a high strength steel material can be formed into a complicated shape with a good precision. Further, it is known that the shaped steel material has sufficient strength since it is hardened at the same time as being shaped by the press die.

In the past, to improve the chemical convertability, coating film adhesion, slidability, etc., of a plated steel sheet for hot stamping, for example, it is known to provide the plated steel sheet with a surface treated layer containing ZnO.

PTL 1 describes a hot dip zinc-based coated steel sheet provided with a surface treated layer containing one or more oxides having particle sizes of 5 nm or more and 500 nm or less selected from zirconia, lanthanum oxide, cerium oxide, and neodymium oxide in a range per side of 0.2 g/m$^2$ or more and 2 g/m$^2$ or less. Further, PTL 1 teaches that the phosphate treatability after hot pressing is raised and the coating film adhesion is improved by the presence of zirconia, lanthanum oxide, cerium oxide, and neodymium oxide in the surface treated layer at the time of heating before the hot pressing and by the Al oxides formed at the time of hot pressing being rendered harmless and thereby the promotion of the formation of zinc oxide (ZnO) at the time of hot pressing.

PTL 2 describes a surface treatment solution for a plated steel sheet for hot pressing containing a ZnO aqueous dispersion (A) and an aqueous dispersible organic resin (B) wherein the ZnO aqueous dispersion (A) contains water and ZnO particles with an average particle size of 10 to 300 nm, the aqueous dispersible organic resin (B) has an emulsion average particle size of 5 to 300 nm, and a mass ratio ($W_A/W_B$) of a mass ($W_A$) of ZnO particles in the ZnO aqueous dispersion and a mass ($W_B$) of solid content of the aqueous dispersible organic resin is 30/70 to 95/5. Further, PTL 2 describes that by using the above surface treatment solution to form a surface treatment film containing ZnO particles and an aqueous dispersible organic resin in a specific mass ratio on the surface of a plated steel sheet, it is possible to secure water-proofness of the film, solvent resistance, and adhesion with the plated steel sheet and obtain a plated steel sheet stably excellent in hot lubrication ability, chemical conversion ability after hot pressing, corrosion resistance after coating, and spot weldability.

PTL 3 describes an Al-based plated steel sheet provided with a steel sheet, an Al-based plating layer formed on one side or both sides of the steel sheet and containing at least Al in a mass % of 85% or more, and a surface coating layer laid on the surface of the Al-based plating layer and containing ZnO and one or more lubrication improving compounds, the lubrication improving compounds being compounds containing transition metal elements of one or more of any of Ti, V, Cr, Mn, Fe, Co, Ni, Cu, Zr, Mo, W, La, and Ce. Further, PTL 3 describes that according to such an Al-based plated steel sheet, it is possible to acquire better lubrication ability than the past, possible to realize improvement of the shapeability and productivity at the time of hot pressing, and furthermore possible to realize even improvement of the chemical conversion ability and the corrosion resistance after coating after hot pressing.

In addition to the above patent literature, as literature describing a surface treated layer able to incorporate ZnO in a plated steel sheet, for example, PTLs 4 to 6 may be mentioned.

CITATIONS LIST

Patent Literature

[PTL 1] WO 2016/159307
[PTL 2] WO 2016/195101
[PTL 3] WO 2013/157522
[PTL 4] Japanese Unexamined Patent Publication No. 2013-519793
[PTL 5] Japanese Unexamined Patent Publication No. 2008-127638
[PTL 6] Japanese Unexamined Patent Publication No. 2007-514865

SUMMARY

Technical Problem

For example, in an Al-based plated steel sheet for hot stamping, a plating layer containing an alloy layer containing Al and Fe and, in some cases, further Si is formed on the steel base material by Fe diffusing from the steel base material (base iron) due to the hot stamping. It is known that such an alloy layer is relatively hard, therefore the hot stamped body provided with the plating layer containing the alloy layer is resistant to defects reaching the steel base material and in general is excellent in corrosion resistance after coating. However, even in such a hot stamped body, once a defect reaching down to the steel base material is formed, the steel base material will become increasingly corroded and the corrosion resistance after coating is liable to fall. For this reason, there is a need for a hot stamped body containing an Al-based plating exhibiting a high corrosion resistance after coating even under more severe conditions and for an Al-plated steel sheet suitable for producing the hot stamped body.

The invention described in PTL 1 relates to hot dip zinc-based coated steel sheet. For this reason, PTL 1 does not describe or suggest in any way a hot stamped body containing an Al-based plating and improvement of its corrosion resistance after coating.

On the other hand, PTL 2 describes a steel sheet, on which a plating layer containing Al is formed, as a plated steel sheet and describes that by forming a surface treatment film containing ZnO particles and an aqueous dispersible organic resin in a specific mass ratio on the surface of such a plated steel sheet, it is possible to obtain a plated steel sheet excellent in corrosion resistance after coating, etc. However, in PTL 2, the additional constituents contained in the surface treatment film are not necessarily sufficiently studied. Therefore, in the invention described in PTL 2, there was still room for improvement in relation to the enhancement of the corrosion resistance after coating, etc.

Further, in PTL 3, improvement of the corrosion resistance after coating is specifically shown in an Al-based plated steel sheet provided with a surface coating layer containing ZnO and lubrication improving compounds containing Ni, Mn, and other specific transition metal elements, but the corrosion resistance after coating in the case of use of lubrication improving compounds containing other transition metal elements is not necessarily sufficiently studied.

Therefore, in the invention described in PTL 3, there was still room for improvement in relation to the enhancement of the corrosion resistance after coating, etc.

Therefore, the present invention has as its object the use of a novel constitution to provide a hot stamped body excellent in corrosion resistance after coating including Al plating and a method for producing the same and an Al-plated steel sheet suitable for producing the hot stamped body.

Solution to Problem

The present invention to achieve the above object is as follows:

(1) A hot stamped body comprising
a steel base material,
an Al-plating layer formed on at least one surface of the steel base material,
a coating formed on the Al-plating layer and containing ZnO particles and $CeO_2$ particles having an average particle size smaller than an average particle size of the ZnO particles, and
a Zn- and Al-containing complex oxide layer formed between the Al-plating layer and the coating.

(2) The hot stamped body according to the above (1), wherein the coating does not contain an organic binder.

(3) The hot stamped body according to the above (1) or (2), wherein the coating has a structure in which the $CeO_2$ particles are deposited around the ZnO particles.

(4) The hot stamped body according to any one of the above (1) to (3), wherein an amount of deposition of ZnO in the coating is 0.60 g/m² or more and 13.00 g/m² or less.

(5) The hot stamped body according to the above (4), wherein the amount of deposition of ZnO in the coating is 1.20 g/m² or more and 10.00 g/m² or less.

(6) The hot stamped body according to any one of the above (1) to (5), wherein the coating contains the $CeO_2$ particles in 1.0 mass % or more and 30.0 mass % or less with respect to a total amount of the ZnO particles and the $CeO_2$ particles.

(7) The hot stamped body according to the above (6), wherein the coating contains the $CeO_2$ particles in 2.0 mass % or more and 25.0 mass % or less with respect to the total amount of the ZnO particles and the $CeO_2$ particles.

(8) The hot stamped body according to any one of the above (1) to (7), wherein an average particle size of the ZnO particles is 0.003 μm or more and 8.000 μm or less and an average particle size of the $CeO_2$ particles is 3.0% or more and 20.0% or less of the average particle size of the ZnO particles.

(9) The hot stamped body according to the above (8), wherein the average particle size of the ZnO particles is 0.010 μm or more and 5.000 μm or less and the average particle size of the $CeO_2$ particles is 8.0% or more and 12.5% or less of the average particle size of the ZnO particles.

(10) The hot stamped body according to the above (9), wherein the average particle size of the ZnO particles is 0.020 μm or more and 4.000 μm or less and the average particle size of the $CeO_2$ particles is 9.0% or more and 12.0% or less of the average particle size of the ZnO particles.

(11) The hot stamped body according to any one of the above (1) to (10), wherein the steel base material comprises, by mass %,
C: 0.01 to 0.50%,
Si: 2.00% or less,
Mn: 0.01 to 3.50%,
P: 0.100% or less,
S: 0.050% or less,
Al: 0.001 to 0.100%,
N: 0.020% or less,
Ti: 0 to 0.100%,
B: 0 to 0.0100%,
Cr: 0 to 1.00%,
Ni: 0 to 5.00%,
Mo: 0 to 2.000%,
Cu: 0 to 1.000%,
Ca: 0 to 0.1000%, and
a balance of Fe and impurities.

(12) The hot stamped body according to any one of the above (1) to (11), wherein the Al-plating layer comprises Si and a balance of Al, Fe and impurities.

(13) A method for producing a hot stamped body according to any one of the above (1) to (12), comprising
forming an Al-plating layer on at least one side of a steel sheet,
coating a surface of the Al-plating layer with an aqueous solution containing ZnO particles and $CeO_2$ particles, then heating it to form a coating containing ZnO particles and $CeO_2$ particles on the Al-plating layer, and
hot pressing the steel sheet having the formed coating eon.

(14) An Al-plated steel sheet comprising
a steel base material,
an Al-plating layer formed on at least one surface of the steel base material, and
a coating formed on the Al-plating layer and containing ZnO particles and $CeO_2$ particles having an average particle size smaller than an average particle size of the ZnO particles.

(15) The Al-plated steel sheet according to the above (14), wherein the coating does not contain an organic binder.

(16) The Al-plated steel sheet according to the above (14) or (15), wherein the coating has a structure in which the $CeO_2$ particles are deposited around the ZnO particles.

Advantageous Effects of Invention

According to the present invention, by using an Al-plated steel sheet comprising an Al-plating layer and a coating formed thereon and containing ZnO particles and having added to the coating $CeO_2$ particles as a corrosion inhibitor and by hot stamping the Al-plated steel sheet, even if a defect reaching down to the steel base material is formed at the obtained hot stamped body, Ce is made to be eluted from the $CeO_2$ particles at the defect part and can form a protective coating at the cathodic reaction region of the exposed part of the steel base material, therefore the progression of the cathodic reaction at the exposed part of the steel base material can be suppressed. As a result, according to the present invention, it is possible to obtain a hot stamped body remarkably suppressed in occurrence of coating film blisters, etc., and excellent in corrosion resistance after coating, in particular long term corrosion resistance after coating.

BRIEF DESCRIPTION OF DRAWINGS

FIGS. 2A to 2C show images of a cross-section of a coating obtained by observation using a scan electron microscope (SEM), wherein FIG. 2A shows a cross-sectional SEM image of a coating containing only ZnO particles and not containing $CeO_2$ particles (Comparative Example 45), FIG. 2B shows a cross-sectional SEM image of a coating containing ZnO particles and $CeO_2$ particles ($CeO_2$ particle content: 5 mass %), and FIG. 2C shows an enlarged view of FIG. 2B.

DESCRIPTION OF EMBODIMENTS

<Hot Stamped Body>

Figure 1:
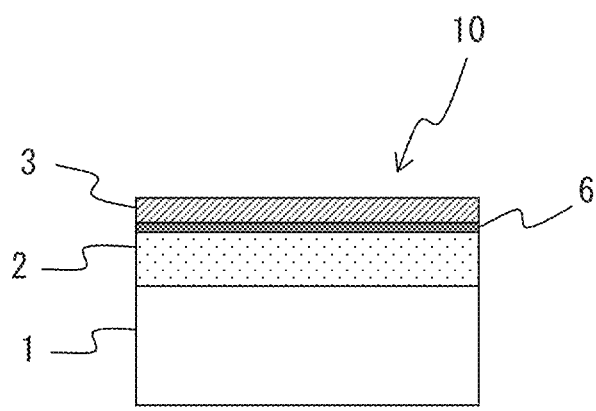
FIG. 1 is a schematic view showing one side part of a hot stamped body of the present invention.

The hot stamped body of the present invention comprises
a steel base material,
an Al-plating layer formed on at least one surface of the steel base material,
a coating formed on the Al-plating layer and containing ZnO particles and $CeO_2$ particles having an average particle size smaller than an average particle size of the ZnO particles, and
a Zn- and Al-containing complex oxide layer formed between the Al-plating layer and the coating.

In an Al-based plated steel sheet for hot stamping, first, in general, a plating layer containing Al and Si is formed on a steel base material (base iron). By performing hot stamping, Fe diffuses from the steel base material whereby a plating layer containing an alloy layer made of Al—Fe—Si, etc., is formed on the steel base material. As explained above, it is known that such an alloy layer is relatively hard, therefore the hot stamped body provided with the plated layer containing the alloy layer is resistant to defects reaching the steel base material and in general is excellent in corrosion resistance after coating. However, even in such a hot stamped body, once a defect reaching down to the steel base material is formed, the steel base material will become increasingly corroded and the corrosion resistance after coating is liable to fall.

More specifically, if a defect reaching down to the steel base material is formed at a hot stamped body including Al plating, plating corrosion where the exposed part of the steel base material acts as the cathode and the Al-plated part acts as the anode will occur at the interface of the steel base material and the plating. In addition, at the exposed part of the steel base material, the cathodic reaction of the dissolved oxygen ($O_2 + 2H_2O + 4e^- \rightarrow OH^-$) will proceed fast, therefore in relation to this, sometimes corrosion at the interface of the steel base material and plating will progress and coating film blisters and other phenomena will arise.

Therefore, the inventors studied the addition of a corrosion inhibitor to a coating provided at a hot stamped body including Al plating for improving the chemical convertability, coating adhesion, slidability, etc., more specifically a coating containing zinc oxide (ZnO) particles. On the other hand, in selecting the corrosion inhibitor, in addition to the corrosion prevention action such as the above which is mainly focused on, from a practical viewpoint, the solution stability at the time of industrial production (nonoccurrence of precipitation, etc.) is extremely important. The inventors discovered that when not considering solution stability, several materials such as boric acid exhibit a suitable corrosion prevention action, but the inventors further studied various materials as corrosion inhibitors able to realize both a corrosion prevention action and solution stability and as a result discovered that it is effective to use cerium oxide ($CeO_2$) particles as the corrosion inhibitor.

Explained in more detail, the inventors discovered that by using an Al-plated steel sheet comprising an Al-plating layer and a coating formed thereon and containing ZnO particles and having added to the coating $CeO_2$ particles having an average particle size smaller than the average particle size of the ZnO particles as a corrosion inhibitor and by hot stamping the Al-plated steel sheet, even if a defect reaching down to the steel base material is formed at the obtained hot stamped body, Ce is made to be eluted from the $CeO_2$ particles at the defect part and can form a protective coating at the cathodic reaction region of the exposed part of the steel base material, therefore the progression of the cathodic reaction at the exposed part of the steel base material can be suppressed. As a result, the inventors discovered that it is possible to obtain a hot stamped body remarkably suppressed in occurrence of coating film blisters, etc., and excellent in corrosion resistance after coating, in particular long term corrosion resistance after coating.

While not intending to be constrained to any specific theory, it is believed that at the above defect part, $Ce^{4+}$ ions are eluted from the $CeO_2$ particles. Further, it is believed that the eluted $Ce^{4+}$ ions move toward the exposed part of the steel base material which has become an alkali environment due to progression of the cathodic reaction ($O_2 + 2H_2O + 4e^- \rightarrow 4OH^-$) so as to maintain electrical neutrality. Here, $Ce^{4+}$ ions are stably present in an alkali environment in the form of hydroxides, therefore precipitate as cerium hydroxide $Ce(OH)_4$. Further, it is believed that this precipitated coating acts as a protective film and inhibits further progression of the cathodic reaction at the exposed part of the steel base material. Further, it is believed that by using $CeO_2$ particles having an average particle size smaller than the average particle size of the ZnO particles, it is possible to make the ZnO particles aggregate relatively densely with each other and reduce the space between ZnO particles, therefore for example it is possible to make the elution of Ce from the $CeO_2$ particles deposited around these particles proceed relatedly slowly and as a result it becomes possible to achieve long term corrosion resistance after coating.

[Steel Base Material]

The steel base material according to a hot stamped body of the present invention may be any steel material having a thickness and composition generally used in hot stamped bodies. As such a steel base material, while not particularly limited to this, a steel material having a 0.3 to 2.3 mm thickness and/or containing a chemical composition comprised of, by mass %, C: 0.01 to 0.50%, Si: 2.00% or less, Mn: 0.01 to 3.50%, P: 0.100% or less, S: 0.050% or less, Al: 0.001 to 0.100%, and N: 0.020% or less and a balance of Fe and impurities can be mentioned. Below, the constituents contained in the above steel base material which is preferably applied in the present invention will be explained in more detail. In the following explanation, the "%" relating to the contents of the constituents means "mass %" unless otherwise indicated.

[C: 0.01 to 0.50%]

C is an element unavoidably contained in steel and/or included so as to secure the targeted mechanical strength. Excessively reducing the C content causes the refining costs to increase, therefore the C content is preferably 0.01% or more. Further, if the C content is less than 0.10%, a need arises to include other alloy elements in large amounts so as to secure the mechanical strength, therefore from the viewpoint of securing the mechanical strength, the C content is preferably 0.10% or more or 0.20% or more. On the other hand, if including C in more than 0.50%, the steel material can be made further harder, but becomes brittle and sometimes hot dip cracks form. Therefore, the C content is preferably 0.50% or less. From the viewpoint of preventing hot dip cracks, the content is more preferably 0.40% or less or 0.30% or less.

[Si: 2.00% or Less]

Si is an element which is added as a deoxidizer and otherwise unavoidably included in the refining process of steel and an element having the effect of improving strength. The Si content may be 0%, but from the viewpoint of improving strength, it is preferably 0.01% or more. For example, Si content may be 0.05% or more or 0.10% or more. On the other hand, excessive inclusion of Si sometimes causes a drop in ductility in the hot rolling step at the time of production of steel sheet or as a result causes deterioration of the surface properties. For this reason, the Si content is preferably 2.00% or less. For example, the Si content may be 1.50% or less or 1.00% or less. Further, Si is an easily oxidizable element. It forms an oxide film on the steel sheet surface, therefore if the Si content is more than 0.60%, at the time of hot dip coating, there is a possibility of the wettability falling and nonplating defects arising. Therefore, more preferably, the Si content is 0.60% or less.

[Mn: 0.01 to 3.50%]

Mn also, like Si, is an element which is added as a deoxidizer and otherwise unavoidably included in the refining process of steel, but has the effects of improving the strength and improving the hardenability and, furthermore, has the effect of suppressing the hot embrittlement due to S. Inclusion of 0.01% or more is preferable. For example, the Mn content may be 0.10% or more or 0.50% or more. On the other hand, if excessively including Mn, sometimes deterioration of the uniformity of quality due to segregation at the time of casting, excessive hardening of the steel, and a drop in the ductility at the time of hot and cold working are invited, therefore the Mn content is preferably 3.50% or less. For example, the Mn content may be 3.00% or less or 2.00% or less.

[P: 0.100% or Less]

P is an unavoidably contained element, but is also a solution strengthening element and is an element which can improve the strength of a steel material at relatively low cost. However, excessive inclusion of P sometimes invites a drop in toughness, therefore the P content is preferably 0.100% or less. For example, the P content may be 0.050% or less or 0.020% or less. On the other hand, the lower limit of the P content may be 0%, but from the refining limit is preferably 0.001%. For example, the P content may be 0.003% or more or 0.005% or more.

[S: 0.050% or Less]

S is also an unavoidably included element. It forms inclusions as MnS which act as starting points for breakage and sometimes harms ductility and toughness and becomes a cause of inferior workability. For this reason, the lower the S content, the more preferable. 0.050% or less is more preferable. For example, the S content may be 0.020% or less or 0.010% or less. On the other hand, the lower limit of the S content may be 0%, but from the cost of production is preferably 0.001%. For example, the S content may be 0.002% or more or 0.003% or more.

[Al: 0.001 to 0.100%]

Al is an element used as a deoxidizer at the time of steelmaking. From the refining limit, the lower limit of the Al content is preferably 0.001%. For example, the Al content may be 0.005% or more or 0.010% or more. Further, Al is an element obstructing plateability, therefore the upper limit of the Al content is preferably 0.100%. For example, the Al content may be 0.080% or less or 0.050% or less.

[N: 0.020% or Less]

N is also an unavoidably included element. However, if too great, an increase in the production costs may be expected, therefore the upper limit of the N content is preferably 0.020%. For example, the N content may be 0.015% or less or 0.010% or less. On the other hand, the lower limit of the N content may be 0%, but from the cost in production is preferably 0.001%. For example, the N content may be 0.002% or more or 0.003% or more.

The basic chemical composition of the steel base material suitable for use in the present invention is as explained above. Furthermore, the steel base material may optionally contain one or more of Ti: 0 to 0.100%, B: 0 to 0.0100%, Cr: 0 to 1.00%, Ni: 0 to 5.00%, Mo: 0 to 2.000%, Cu: 0 to 1.000%, and Ca: 0 to 0.1000%. Below, these optional elements will be explained in detail.

[Ti: 0 to 0.100%]

Ti is one of the strengthening elements and an element improving the heat resistance of the Al-based plating layer. If the Ti content is less than 0.005%, the effect of improvement of the strength or the heat resistance cannot be sufficiently obtained, therefore the Ti content is preferably 0.005% or more. For example, Ti content may be 0.010% or more or 0.015% or more. On the other hand, if excessively including Ti, for example, carbides and nitrides are formed leading to softening of the steel material, therefore the Ti content is preferably 0.100% or less. For example, the Ti content may be 0.080% or less or 0.050% or less.

[B: 0 to 0.0100%]

B is an element having the effect of acting to improve the strength of the steel material at the time of hardening. If the B content is less than 0.0003%, such an effect of improvement of the strength is not sufficiently obtained. On the other hand, if more than 0.0100%, inclusions (for example, BN, borocarbides, etc.) are formed resulting in embrittlement and the fatigue strength is liable to be lowered. Therefore, the B content is preferably 0.0003 to 0.0100%. For example, the B content may be 0.0010% or more or 0.0020% or more and/or 0.0080% or less or 0.0060% or less.

[Cr: 0 to 1.00%]

Cr has the effect of suppressing the formation of nitrides formed at the interface of the Al-based plating layer and causing the Al-based plating layer to peel off. Further, Cr is also an element improving the wear resistance and improving the hardenability. If the Cr content is less than 0.01%, the above effects cannot be sufficiently obtained. On the other hand, if the Cr content is more than 1.00%, not only do the above effects become saturated, but also the production costs of the steel material rise. Therefore, the Cr content is preferably 0.01 to 1.00%.

For example, Cr content may be 0.05% or more or 0.10% or more and/or 0.80% or less or 0.50% or less.

[Ni: 0 to 5.00%]

Ni has the effect of improving the hardenability at the time of hot pressing and also has the effect of raising the corrosion resistance of the steel material itself. If the Ni content is less than 0.01%, these effects cannot be sufficiently obtained. On the other hand, if the Ni content is more than 5.00%, not only do the above effects become saturated, but also the production costs of the steel material rise. Therefore, the Ni content is preferably 0.01 to 5.00%. For example, the Ni content may be 0.05% or more or 0.10% or more and/or 3.00% or less or 2.00% or less.

[Mo: 0 to 2.000%]

Mo has the effect of improving the hardenability at the time of hot pressing and also has the effect of raising the corrosion resistance of the steel material itself. If the Mo content is less than 0.005%, these effects cannot be sufficiently obtained. On the other hand, if the Mo content is more than 2.000%, not only do the above effects become saturated, but also the production costs of the steel material rise. Therefore, the Mo content is preferably 0.005 to 2.000%. For example, the Mo content may be 0.010% or more or 0.100% or more and/or 1.500% or less or 1.000% or less.

[Cu: 0 to 1.000%]

Cu has the effect of improving the hardenability at the time of hot pressing and also has the effect of raising the corrosion resistance of the steel material itself. If the Cu content is less than 0.005%, these effects cannot be sufficiently obtained. On the other hand, if the Cu content is more than 1.000%, not only do the above effects become saturated, but also the production costs of the steel material rise. Therefore, the Cu content is preferably 0.005 to 1.000%. For example, the Cu content may be 0.010% or more or 0.050% or more and/or 0.500% or less or 0.200% or less.

[Ca: 0 to 0.1000%]

Ca is an element for controlling inclusions. If the Ca content is less than 0.0002%, the effect cannot be sufficiently obtained, therefore the Ca content is preferably 0.0002% or more. For example, Ca content may be 0.0010% or more or 0.0020% or more. On the other hand, if the Ca content is more than 0.1000%, the alloy cost becomes higher, therefore the Ca content is preferably 0.1000% or less. For example, the Ca content may be 0.0500% or less or 0.0100% or less.

Furthermore, the steel base material according to a hot stamped body of the present invention may suitably contain other elements in a range not detracting from the effect of the present invention explained in this Description in addition to or in place of the above optional elements. For example, W, V, Nb, Sb, and other elements may be suitably included.

In the steel base material according to a hot stamped body of the present invention, the balance other than the above constituents consists of Fe and impurities. Here, the impurities in the steel base material are constituents, etc., entering due to various factors in the production process such as the ore, scrap or other raw materials when industrially producing the hot stamped body according to the present invention.

[Al-Plating Layer]

According to the present invention, an Al-plating layer is formed on at least one side of the steel base material, i.e., on one side or both sides of the steel base material. In the hot stamped body of the present invention, the "Al-plating layer" means a plating layer in which the chemical composition right after plating mainly consists of Al, more specifically, a plating layer in which the chemical composition right after plating comprises more than 50 mass % of Al. If performing hot stamping, Fe diffuses from the steel base material to inside the Al-plating layer, therefore the chemical composition of the Al-plating layer changes depending on the heat treatment conditions (heating temperature, holding time, etc.) at the time of hot stamping. For example, if the amount of diffusion of Fe from the steel base material to the Al-plating layer becomes greater, even if the Al content right after plating is more than 50 mass %, the Al content after hot stamping will fall from that. Therefore, the chemical composition of the Al-plating layer according to the present invention after hot stamping does not necessarily have to be Al: more than 50 mass %.

The Al-plating layer according to the hot stamped body of the present invention preferably contains Si. In general, it is known that, in an Al-based plated steel sheet for hot stamping, at the time of the plating treatment, Fe diffuses from the steel base material and that the diffused Fe reacts with the Al in the plating layer whereby an Al—Fe alloy layer is formed at the interface of the plating layer and the steel base material. An Al—Fe alloy layer is a hard layer, therefore if an Al—Fe alloy layer is excessively formed, for example, the shapeability of the steel sheet at the time of cold working is liable to be impaired. Here, it is known that the Si in the Al-plating layer has the function of suppressing the formation of such an Al—Fe alloy layer. Further, by including Si, the Al-plating layer according to the present invention after hot stamping is alloyed with the Fe diffusing from the steel base material into the Al-plating layer at the time of hot stamping, whereby a relatively hard Al—Fe-Si alloy layer can be included. As a result, in the finally obtained Al-plated hot stamped body, it becomes possible to reliably maintain a high resistance even against formation of defects which would reach the steel base material.

Furthermore, the Al-plating layer according to the hot stamped body of the present invention may also suitably contain other elements in a range not obstructing the effect of the present invention. For example, the Al-plating layer may, in addition to Si, optionally contain Mg, Ca, Sr, mischmetal, or other elements for improving the corrosion resistance of the Al-plating layer.

In the Al-plating layer according to the hot stamped body of the present invention, the balance other than the above constituents (i.e., Si, Mg, Ca, Sr, mischmetal, and other elements) consists of Al, Fe and impurities. Here, the "impurities" in the Al-plating layer are raw materials first and foremost and other constituents, etc., entering due to various factors in the production process when producing an Al-plating layer (however, excluding Fe eluted from the steel base material into the plating bath and Fe diffusing from the steel base material into the Al-plating layer at the time of hot stamping).

[Coating Containing ZnO Particles and $CeO_2$ Particles Having Average Particle Size Smaller Than Average Particle Size of ZnO Particles]

According to the present invention, the above Al-plating layer is formed with a coating containing ZnO particles and $CeO_2$ particles having an average particle size smaller than the average particle size of the ZnO particles. FIG. 1 is a schematic view showing one side part of the hot stamped body of the present invention (i.e., the hot stamped body of the present invention may also have an Al-plating layer not only on one side of the steel base material, but both sides). Referring to FIG. 1, it will be understood that the hot stamped body 10 of the present invention has a structure where an Al-plating layer 2 is formed on one side of a steel base material (base iron) 1, a coating 3 containing ZnO particles and $CeO_2$ particles is further formed on the Al-plating layer 2, and, while explained in detail later, a Zn- and Al-containing complex oxide layer 6 is formed between the Al-plating layer 2 and coating 3. In general, it is known that by forming the coating containing ZnO particles on the Al-plating layer, the chemical convertability, coating film adhesion, slidability, etc., of the steel material including the Al plating can be improved. However, as explained earlier, if a defect reaching down to the steel base material is formed at such a steel material, plating corrosion where the exposed part of the steel base material acts as the cathode and the Al-plated part acts as the anode occurs at the interface of the steel base material and the plating. In addition, at the exposed part of the steel base material, the cathodic reaction of the dissolved oxygen ($O_2+2H_2O+4e^-\rightarrow 4OH^-$) proceeds fast, therefore in relation to this, sometimes corrosion at the interface of the steel base material and plating progresses and coating film blisters and other phenomena arise.

As opposed to this, in the present invention, by further including $CeO_2$ particles having an average particle size smaller than the average particle size of the ZnO particles in a conventional coating including ZnO particles, even if a defect reaching the steel base material is formed in the hot stamped body including the Al plating, at the defect part, the cerium constituent, more specifically, $Ce^{4+}$ ions, is made to be eluted from the $CeO_2$ particles to form a protective coating, more specifically a protective coating comprised of $Ce(OH)_4$, at the cathodic reaction region of the exposed part of the steel base material, therefore it becomes possible to suppress the further progression of a cathodic reaction at the exposed part of the steel base material. As a result, according to the present invention, it is possible to obtain a hot stamped body remarkably suppressed in occurrence of coating film blisters, etc., and excellent in corrosion resistance after coating.

In the present invention, it is important that the coating include cerium in the form of $CeO_2$ particles. For example, if the coating includes cerium in the form of a cerium salt of cerium nitrate ($Ce(NO_3)_3$), etc., the elution rate of cerium ions to the exposed part of the steel base material becomes faster, therefore excessive formation of the protective coating is caused and in turn early depletion of the source of supply of the protective coating (i.e., cerium salts) is invited.

On the other hand, if the coating includes cerium in the form of $CeO_2$ particles, compared with a cerium salt, the elution rate of cerium ions to the exposed part of the steel base material can be controlled to a suitable range, therefore this is extremely effective from the viewpoint of achievement of long term corrosion resistance after coating. Furthermore, it is believed that by using $CeO_2$ particles having an average particle size smaller than the average particle size of the ZnO particles, it is possible to make the ZnO particles aggregate relatively densely with each other to reduce the space between ZnO particles, therefore for example it is possible to make the elution of Ce from the $CeO_2$ particles deposited in the vicinity of these particles proceed relatedly slowly and as a result it becomes possible to achieve long term corrosion resistance after coating.

[Zn- and Al-Containing Complex Oxide Layer]

Figure 4:
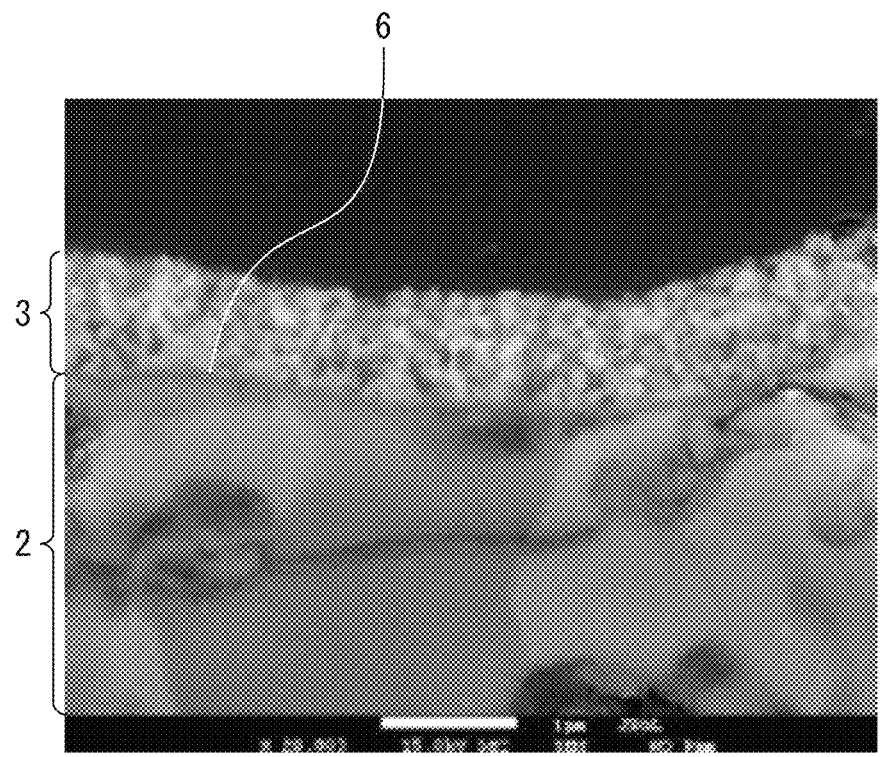
FIG. 4 shows a cross-sectional image obtained by an SEM of a hot stamped body according to one embodiment of the present invention (amount of deposition of ZnO: 2.49 g/m$^2$).

In the present invention, the hot stamped body, as explained in relation to FIG. 1, further contains a Zn- and Al-containing complex oxide layer between the Al-plating layer and the coating containing the ZnO particles and $CeO_2$ particles. FIG. 4 shows a cross-sectional image obtained by an SEM of a hot stamped body according to one embodiment of the present invention (amount of deposition of ZnO: 2.49 g/m$^2$). Referring to FIG. 4, it is possible to confirm a thin layer (Zn- and Al-containing complex oxide layer) 6 between the Al-plating layer 2 and the coating 3 containing the ZnO particles and $CeO_2$ particles. It was learned by later analysis that the Zn- and Al-containing complex oxide layer 6 was a layer comprised of spinel type complex metal oxides represented by $ZnAl_2O_4$ in which some of the elements are replaced or not replaced by Ce. Such a layer is formed at the time of hot stamping at a high temperature, for example, 850° C. or a higher high temperature. The coating film adhesion according to the hot stamped body of the present invention can be improved.

(Noninclusion of Organic Binder)

According to the present invention, the above coating preferably does not contain a resin or other organic binder. In a conventional coating including ZnO particles, for example, as the binder constituent for the ZnO particles, sometimes an organic binder selected from a polyurethane resin, epoxy resin, acrylic resin, and polyester resin, a silane coupling agent, etc., is used. However, in a coating including ZnO particles, if further including such an organic binder, under the high temperature at the time of hot stamping, part or all of the carbon forming the organic binder will burn and form carbon monoxide or carbon dioxide whereby at least part of the organic binder will be consumed. Furthermore, at the time of such burning, oxygen is liable to be robbed from part or the majority of the ZnO particles adjoining the organic binder. Here, if ZnO particles are robbed of oxygen and are reduced to metal Zn, since its boiling point is about 907° C. or relatively low, the metal Zn is liable to partially be consumed at the time of hot stamping at 900° C. or a higher high temperature. In such a case, there is a possibility of the intended form and/or function of the coating including ZnO particles no longer be able to be sufficiently maintained. Therefore, the coating according to the hot stamped body of the present invention preferably does not contain an organic binder and is more preferably comprised of only ZnO particles and $CeO_2$ particles.

(Structure of Coating)

Figure 2:
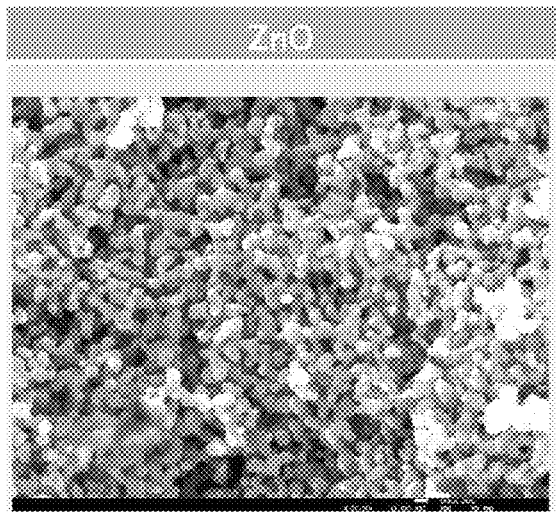
Figure 2:
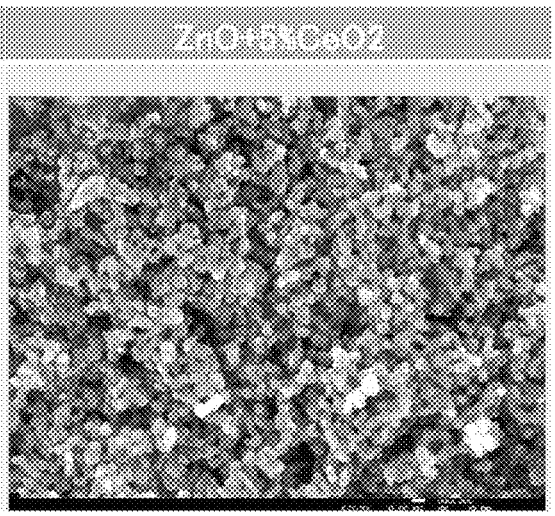
Figure 2:
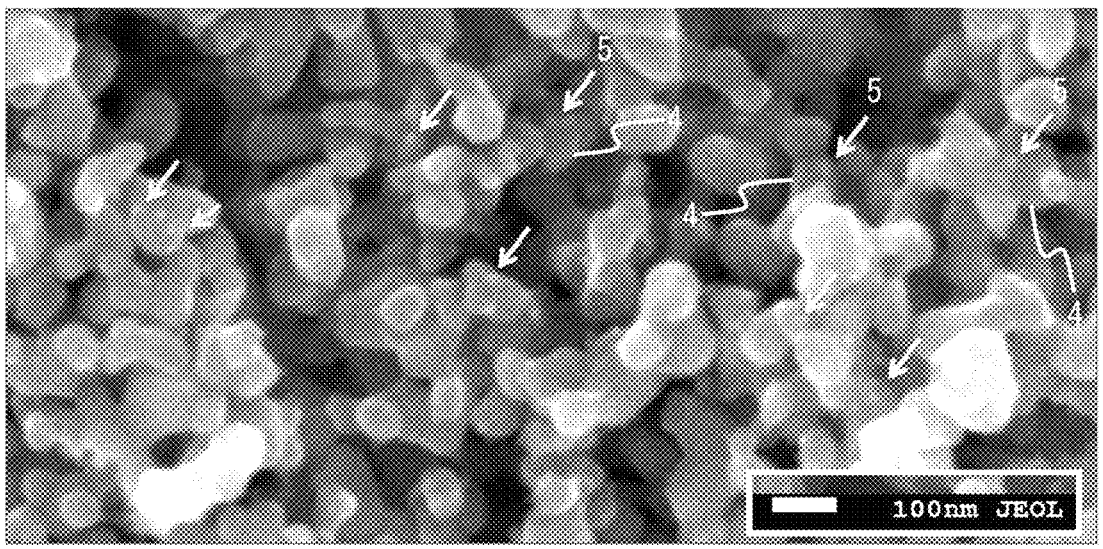

According to a preferable aspect of the present invention, a coating containing ZnO particles and $CeO_2$ particles has a structure where $CeO_2$ particles are deposited around the ZnO particles. FIGS. 2A to 2C show images of a cross-section of a coating obtained by observation using a scan electron microscope (SEM), wherein FIG. 2A shows a cross-sectional SEM image of a coating containing only ZnO particles and not containing $CeO_2$ particles (Comparative Example 45), FIG. 2B shows a cross-sectional SEM image of a coating containing ZnO particles and $CeO_2$ particles ($CeO_2$ particles content: 5 mass %), and FIG. 2C shows an enlarged view of FIG. 2B.

Referring to FIGS. 2A and 2B, it will be understood that regardless of the presence or absence of $CeO_2$ particles, the ZnO particles are present in a state aggregated relatively densely. Further, referring to FIG. 2C, it will be understood that the coating according to the hot stamped body of the present invention has a structure where $CeO_2$ particles 5 are deposited around the ZnO particles 4 as shown by the arrows. By having such a structure, the ZnO particles can be made to aggregate relatively densely to reduce the space between the ZnO particles, therefore it becomes possible to make the elution of Ce from the $CeO_2$ particles deposited around these particles progress relatively slowly. Therefore, such a structure is extremely advantageous from the viewpoint of achieving long term corrosion resistance after coating.

(Amount of Deposition of ZnO in Coating)

The amount of deposition of ZnO in the coating is preferably 0.60 g/m$^2$ or more and 13.00 g/m$^2$ or less. If the amount of deposition of ZnO in the coating is less than 0.60 g/m$^2$, sometimes the effects obtained due to addition of ZnO particles, for example, the effect of improvement of the chemical convertability, coating film adhesion, etc., cannot be sufficiently manifested. As a result, sometimes a drop in the corrosion resistance after coating is invited. On the other hand, if the amount of deposition of ZnO in the coating becomes more than 13.00 g/m$^2$, the coating becomes too thick and the space between ZnO particles becomes too small and therefore sometimes elution of Ce to the cathodic reaction region of the exposed part of the steel base material is inhibited. For example, the amount of deposition of ZnO in the coating may be 0.70 g/m$^2$ or more, 1.00 g/m$^2$ or more, or 1.20 g/m$^2$ or more and/or 10.00 g/m$^2$ or less, 7.00 g/m$^2$ or less, 6.00 g/m$^2$ or less, 5.00 g/m$^2$ or less, 3.00 g/m$^2$ or less, or 2.00 g/m$^2$ or less. The amount of deposition of ZnO in the coating is more preferably 1.20 g/m$^2$ or more and 10.00 g/m$^2$ or less, most preferably 1.20 g/m$^2$ or more and 5.00 g/m$^2$ or less.

(Content of CeO$_2$ Particles in Coating)

The content of CeO$_2$ particles in the coating is preferably 1.0 mass % or more and 30.0 mass % or less with respect to the total amount of the ZnO particles and CeO$_2$ particles. If the content of CeO$_2$ particles in the coating is less than 1.0 mass % with respect to the total amount of the ZnO particles and CeO$_2$ particles, sometimes the effect obtained due to addition of CeO$_2$ particles, i.e., the effect of improvement of the corrosion resistance after coating, cannot be sufficiently manifested. On the other hand, if the content of CeO$_2$ particles in the coating becomes more than 30.0 mass % with respect to the total amount of the ZnO particles and CeO$_2$ particles, the content of ZnO particles becomes smaller, therefore the effect due to the presence of the ZnO particles, for example, the effect of improvement of the chemical convertability, the coating film adhesion, etc., can no longer be sufficiently manifested. For example, the content of CeO$_2$ particles in the coating may be 2.0 mass % or more, 3.0 mass % or more, 4.0 mass % or more, 5.0 mass % or more, or 6.0 mass % or more and/or 25.0 mass % or less, 20.0 mass % or less, 17.0 mass % or less, or 15.0 mass % or less with respect to the total amount of the ZnO particles and CeO$_2$ particles.

Furthermore, speaking from the viewpoint of the corrosion resistance after coating, if the content of CeO$_2$ particles becomes more than 15.0 mass % with respect to the total amount of the ZnO particles and CeO$_2$ particles, the effect of improvement of the corrosion resistance after coating is strengthened, but on the other hand, elution of Ce is promoted, therefore this sometimes becomes disadvantageous from the viewpoint of the long term corrosion resistance after coating. Therefore, the content of CeO$_2$ particles in the coating has to be suitably determined considering the effect of improvement of the coating film adhesion, etc., due to the ZnO particles and the effect of improvement of the corrosion resistance after coating due to the CeO$_2$ particles, in particular the effect of improvement of the long term corrosion resistance after coating. For example, from the viewpoint of reliably maintaining the effect due to the ZnO particles while realizing to the maximum extent the long term corrosion resistance after coating, the content of CeO$_2$ particles in the coating is more preferably 2.0 mass % or more and 25.0 mass % or less, most preferably 5.0 mass % or more or 6.0 mass % or more and 15.0 mass % or less, with respect to the total amount of the ZnO particles and CeO$_2$ particles.

In the present invention, the amount of deposition of ZnO in the coating and the content of CeO$_2$ particles with respect to the total amount of the ZnO particles and CeO$_2$ particles are determined as follows: Specifically, if the aqueous solution or other solution coated on the surface of the Al-plating layer at the time of formation of the coating contains only ZnO particles and CeO$_2$ particles as coating constituents and the mixing ratio of the same is known, the amount of deposition of ZnO in the coating and the content of CeO$_2$ particles with respect to the total amount of the ZnO particles and CeO$_2$ particles are determined from the mixing ratio and the thickness of the coating formed. On the other hand, if the mixing ratio of the ZnO particles and CeO$_2$ particles in the solution is unknown, the amount of deposition of ZnO in the coating and the content of CeO$_2$ particles with respect to the total amount of the ZnO particles and CeO$_2$ particles are determined by analyzing the coating according to the hot stamped body of the present invention using fluorescent X-ray analysis based on JIS G 3314: 2011. More particularly, first, fluorescent X-ray analysis is used to measure the amounts of deposition of metal Zn and metal Ce in the coating, then these measurement values are converted to the amounts of deposition of ZnO and CeO$_2$ to thereby determine the amount of deposition of ZnO and the amount of deposition of CeO$_2$ in the coating. The content of CeO$_2$ particles is determined from the ratio of the amount of deposition of CeO$_2$ to the total of these amounts of deposition.

(Average Particle Size of ZnO Particles and CeO$_2$ Particles)

According to the present invention, preferably the average particle size of the ZnO particles is 0.003 μm or more and 8.000 μm or less and the average particle size of the CeO$_2$ particles is 3.0% or more and 20.0% or less of the average particle size of the ZnO particles. By controlling the average particle sizes of the ZnO particles and the CeO$_2$ particles to the above ranges, as shown in FIG. 2C, it is possible to make the ZnO particles aggregate with each other relatively densely to make the space between the ZnO particles smaller and form a coating having a structure where CeO$_2$ particles are deposited around these particles. For this reason, it is possible to make the elution of Ce proceed relatively slowly and as a result becomes possible to achieve long term corrosion resistance after coating. For example, the average particle size of the ZnO particles may be 0.005 μm or more, 0.008 μm or more, 0.010 μm or more, 0.030 μm or more, 0.050 μm or more, 0.080 μm or more, 0.100 μm or more, 0.500 μm or more, or 0.600 μm or more and/or may be 7.000 μm or less, 6.000 μm or less, 5.000 μm or less, 4.000 μm or less, 3.000 μm or less, 1.000 μm or less, 0.900 μm or less, or 0.800 μm or less. Similarly, the average particle size of the CeO$_2$ particles of 4.0% or more, 5.0% or more, 6.0% or more, 8.0% or more, 8.5% or more, 9.0% or more, or 9.5% or more and/or 18.0% or less, 16.0% or less, 14.0% or less, 12.5% or less, 12.0% or less, 11.0% or less, or 10.5% or less of the average particle size of the ZnO particles. To make the above effect reliable, the average particle size of the ZnO particles is more preferably 0.050 μm or more and 4.000 μm or less or 3.000 μm or less, most preferably 0.050 μm or more and 0.900 μm or less. Similarly, the average particle size of the CeO$_2$ particles is more preferably more 9.0% or more and 12.0% or less, most preferably 9.5% or more and 10.5% or less, with respect to the average particle size of the ZnO particles.

In the present invention, the average particle size of the ZnO particles was determined by using an SEM or other electron microscope to examine the surface of the coating of the steel material at a 4 μm×3 μm field (corresponding to 30,000× power) for any two or more locations, selecting 10 or more primary particles (ZnO) for each field and measuring their diameters, and arithmetically averaging the obtained measurement values. However, for example, if the primary particles (ZnO) are large, if not possible to measure the diameters of 10 or more primary particles in a 4 μm×3 μm field, similarly it was determined by examining the surface of the coating of the hot stamped body at any two or more locations in 12 μm×9 μm fields (corresponding to 10,000× power), selecting 10 or more primary particles (ZnO) for each field and measuring their diameters, and arithmetically averaging the obtained measurement values. Furthermore, if not possible to measure the diameters of 10 or more primary particles in 12 μm×9 μm fields, similarly it is determined by examining the surface of the coating of the steel material at a 36 μm×27 μm field (corresponding to 3,300× power) for any two or more locations, selecting 10 or more primary particles (ZnO) for each field and measuring their diameters, and arithmetically averaging the obtained measurement values. Regarding the average particle size of the $CeO_2$ particles as well, in the same way as the case of ZnO particles, this was determined by using a SEM or other electron microscope to examine the surface of the coating of the hot stamped body at a 4 μm×3 μm field (corresponding to 30,000× power) for any two or more locations, selecting 10 or more particles deposited around the ZnO particles for each field, analyzing these particles by an energy dispersive X-ray spectrograph (EDS) to confirm the presence of Ce and thereby identify $CeO_2$, then measuring their diameters and arithmetically averaging the obtained measurement values.

Figure 3:
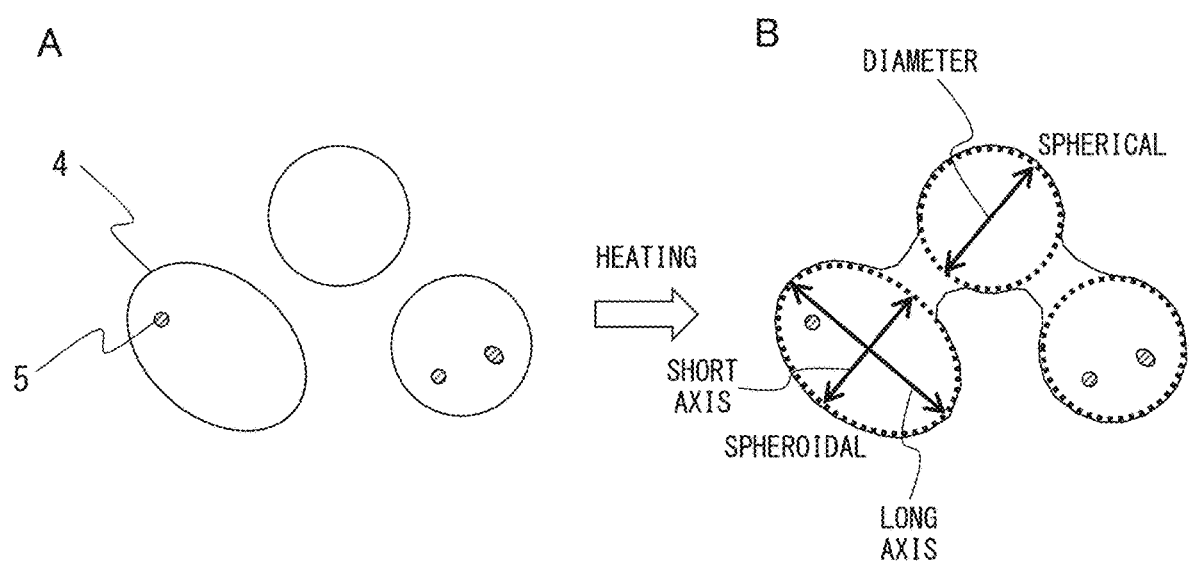
FIG. 3 is a view schematically showing a method of measurement of an average particle size relating to ZnO particles and $CeO_2$ particles in the present invention.

FIG. 3 is a view schematically showing a method of measurement of the average particle size for ZnO particles and $CeO_2$ particles in the present invention. FIG. 3(a) shows the state of ZnO particles and $CeO_2$ particles present in a coating before heating relating to hot pressing, while FIG. 3(b) shows the state of ZnO particles and $CeO_2$ particles present in a coating after the heating. As shown in FIG. 3(b), due to the heating at a high temperature relating to hot pressing, at least part of the ZnO particles 4 in the coating melt-bond with each other, but the shapes of the ZnO particles 4 before heating can be sufficiently surmised. In the present invention, the average particle sizes of the ZnO particles 4 and $CeO_2$ particles 5 present in the state such as shown in FIG. 3(b) are determined by the method explained above. More specifically, if, as shown in FIG. 3(b), a particle is spherical or substantially spherical, the diameter of the particle is simply measured. On the other hand, if a particle is spheroidal or otherwise not spherical, the longest axis of the particle (long axis) and the shortest axis of the particle perpendicular to the same (short axis) are measured and the arithmetic average is made the particle size of the particle.

<Method for Producing Hot Stamped Body>

For example, the hot stamped body of the present invention having the above features can be produced by a method comprising forming an Al-plating layer on at least one side of a steel sheet, coating a surface of the Al-plating layer with an aqueous solution containing ZnO particles and $CeO_2$ particles, then heating it to form a coating containing ZnO particles and $CeO_2$ particles on the Al-plating layer, and hot pressing the steel sheet having the formed coating thereon. Below, the steps of this method of production will be explained in detail.

[Step for Forming Al-Plating Layer]

In the step for forming the Al-plating layer, at least one side of a steel sheet having a predetermined thickness and composition is formed with Al plating by the Sendzimir process.

The steel sheet is not particularly limited, but for example, as explained in relation to the steel base material, may have a thickness of 0.3 to 2.3 mm and contain, by mass %, C: 0.01 to 0.50%, Si: 2.00% or less, Mn: 0.01 to 3.50%, P: 0.100% or less, S: 0.050% or less, Al: 0.001 to 0.100%, and N: 0.020% or less, have a balance of Fe and impurities, and optionally contain, furthermore, one or more of Ti: 0 to 0.100%, B: 0 to 0.0100%, Cr: 0 to 1.00%, Ni: 0 to 5.00%, Mo: 0 to 2.000%, Cu: 0 to 1.000%, and Ca: 0 to 0.1000%.

More specifically, first, the above steel sheet, in particular the cold rolled steel sheet, is annealed in an $N_2$-$H_2$ mixed gas atmosphere for a predetermined temperature and time, for example, a temperature of 750 to 850° C. for 10 seconds to 5 minutes, then is cooled down to the vicinity of the plating bath temperature in a nitrogen atmosphere or other inert atmosphere. Next, this steel sheet is dipped in an Al plating bath containing 3 mass % or more and 15 mass % or less of Si at 600 to 750° C. in temperature for 0.1 to 60 seconds, then is pulled out and immediately blown with $N_2$ gas or air by the gas wiping method to adjust the amount of deposition of the Al plating to a predetermined range, for example, 40 to 200 g/m² in range at the two sides. Finally, the steel sheet is blown with air, etc., to cool it, whereby one side or both sides of the steel sheet are formed with an Al-plating layer.

[Step of Forming Coating] Next, in the step for forming the coating, the Al-plating layer is formed with a coating containing ZnO particles and $CeO_2$ particles. More specifically, the Al-plating layer is coated by a bar coater with an aqueous solution containing ZnO particles and $CeO_2$ particles having average particle sizes within suitable ranges, for example, average particle sizes in the range explained above in a mixing ratio giving a content of $CeO_2$ particles in the range explained above in the same way. When coating by a bar coater, etc., the wet film thickness is adjusted to give a predetermined amount of deposition of ZnO, for example, an amount of deposition of ZnO of 0.60 g/m² or more and 13.00 g/m² or less. Finally, the steel sheet is heated at a peak temperature of 60 to 100° C. whereby a coating containing ZnO particles and $CeO_2$ particles is baked on the Al-plating layer.

[Hot Pressing Step]

Next, the hot stamped body of the present invention is produced by hot stamping the steel sheet on which the coating containing ZnO particles and $CeO_2$ particles is formed in the hot pressing step. The above hot pressing can be performed by any method known to a person skilled in the art. While not particularly limited, for example, the steel sheet after the step for forming the coating can be heated by an approximately 50 to 300° C./s rate of temperature rise up to the Ac3 point or more in temperature, generally approximately 850 to 1000° C. in temperature, then hot pressed over a predetermined time. Here, with a less than 850° C. heating temperature, a sufficient hardness may not be obtained, therefore this is not preferable. Further, if the heating temperature is more than 1000° C., due to the excessive diffusion of Fe from the steel base material to the Al-plating layer, sometimes the alloying of the Al and Fe progresses too much. In such a case, a drop in the corrosion resistance after coating is sometimes invited, therefore this is not preferable. Further, the hardening by the die at the time of hot pressing is not particularly limited, but, for example, after leaving the heating furnace, the steel sheet is cooled by an average cooling rate of 30° C./s or more until the temperature falls to 400° C.

(Chemical Conversion Treatment and Coating Treatment)

The hot-pressed steel sheet may be chemically converted on the coating containing ZnO particles and $CeO_2$ particles to form a phosphate coating, then coated by electrodeposition coating, etc. Due to this, it is possible to improve the adhesion of the coating. The chemical conversion treatment and coating treatment can be performed under any suitable conditions known to persons skilled in the art.

<Al-Plated Steel Sheet>

In the present invention, in addition to the above hot-pressed member and method for producing the same, an Al-plated steel sheet suitable for producing the hot stamped body is provided. The Al-plated steel sheet comprises a steel base material, an Al-plating layer formed on at least one surface of the steel base material, and a coating formed on the Al-plating layer and containing ZnO particles and $CeO_2$ particles having an average particle size smaller than an average particle size of the ZnO particles.

The Al-plated steel sheet of the present invention corresponds to the hot stamped body explained above in the state before hot pressing (hot stamping). Therefore, the Al-plated steel sheet has features similar to the hot stamped body explained previously other than the Zn- and Al-containing complex oxide layer formed between the Al-plating layer and coating containing ZnO particles and $CeO_2$ particles at the time of hot stamping. Below, these features will be explained in detail.

[Steel Base Material]

The steel base material according to the Al-plated steel sheet of the present invention may be any steel material having a thickness and composition generally used in hot stamped bodies.

As such a steel base material, while not particularly limited to this, a steel material having a 0.3 to 2.3 mm thickness and/or containing, by mass %, C: 0.01 to 0.50%, Si: 2.00% or less, Mn: 0.01 to 3.50%, P: 0.100% or less, S: 0.050% or less, Al: 0.001 to 0.100%, N: 0.020% or less and a balance of Fe and impurities can be mentioned. Below, the constituents contained in the above steel base material which is preferably applied in the present invention will be explained in more detail. In the following explanation, the "%" relating to the contents of the constituents means "mass %" unless otherwise indicated.

[C: 0.01 to 0.50%]

Carbon (C) is an element unavoidably contained in steel and/or included so as to secure the targeted mechanical strength. Excessively reducing the C content causes the refining costs to increase, therefore the C content is preferably 0.01% or more. Further, if the C content is less than 0.10%, a need arises to include other alloy elements in large amounts so as to secure the mechanical strength, therefore from the viewpoint of securing the mechanical strength, the C content is preferably 0.10% or more or 0.20% or more. On the other hand, if the C content is more than 0.50%, the steel material can be made further harder, but becomes brittle and sometimes hot dip cracks form. Therefore, the C content is preferably 0.50% or less. From the viewpoint of preventing hot dip cracks, the content is more preferably 0.40% or less or 0.30% or less.

[Si: 2.00% or Less]

Si is an element which is added as a deoxidizer and otherwise unavoidably included in the refining process of steel and an element having the effect of improving strength. The Si content may be 0%, but from the viewpoint of improving strength, it is preferably 0.01% or more. For example, the Si content may be 0.05% or more or 0.10% or more. On the other hand, excessive inclusion of Si sometimes causes a drop in ductility in the hot rolling step at the time of production of steel sheet or as a result causes deterioration of the surface properties. For this reason, the Si content is preferably 2.00% or less. For example, the Si content may be 1.50% or less or 1.00% or less. Further, Si is an easily oxidizable element. It forms an oxide film on the steel sheet surface, therefore if the Si content is more than 0.60%, at the time of hot dip coating, there is a possibility of the wettability falling and nonplating defects arising. Therefore, more preferably, the Si content is 0.60% or less.

[Mn: 0.01 to 3.50%]

Mn is an element which is added as a deoxidizer and otherwise unavoidably included in the refining process of steel, but has the effect of improving the strength and improving the hardenability and, furthermore, has the effect of suppressing the hot embrittlement due to S. Inclusion of 0.01% or more is preferable. For example, the Mn content may be 0.10% or more or 0.50% or more. On the other hand, if excessively including Mn, sometimes deterioration of the uniformity of quality due to segregation at the time of casting, excessive hardening of the steel, and a drop in the ductility at the time of hot and cold working are invited, therefore the Mn content is preferably 3.50% or less. For example, the Mn content may be 3.00% or less or 2.00% or less.

[P: 0.100% or Less]

P is an unavoidably contained element, but is also a solution strengthening element and is an element which can improve the strength of a steel material at relatively low cost. However, excessive inclusion of P sometimes invites a drop in toughness, therefore the P content is preferably 0.100% or less. For example, the P content may be 0.050% or less or 0.020% or less. On the other hand, the lower limit of the P content may be 0%, but from the refining limit is preferably 0.001%. For example, the P content may be 0.003% or more or 0.005% or more.

[S: 0.050% or Less]

S is also an unavoidably included element. It forms inclusions as MnS which act as starting points for breakage and sometimes harm ductility and toughness and becomes a cause of inferior workability. For this reason, the lower the S content, the more preferable. 0.050% or less is more preferable. For example, the S content may be 0.020% or less or 0.010% or less. On the other hand, the lower limit of the S content may be 0%, but from the production costs is preferably 0.001%. For example, the S content may be 0.002% or more or 0.003% or more.

[Al: 0.001 to 0.100%]

Al is an element used as a deoxidizer at the time of steelmaking. From the refining limit, the lower limit of the Al content is preferably 0.001%. For example, the Al content may be 0.005% or more or 0.010% or more. Further, Al is an element obstructing plateability, therefore the upper limit of the Al content is preferably 0.100%. For example, the Al content may be 0.080% or less or 0.050% or less.

[N: 0.020% or Less]

N is also an unavoidably included element. However, if too great, an increase in the production costs may be expected, therefore the upper limit of the N content is preferably 0.020%. For example, the N content may be 0.015% or less or 0.010% or less. On the other hand, the lower limit of the N content may be 0%, but from the cost in production is preferably 0.001%. For example, the N content may be 0.002% or more or 0.003% or more.

The basic chemical composition of the steel base material suitable for use in the present invention is as explained above. Furthermore, the steel base material may optionally contain one or more of Ti: 0 to 0.100%, B: 0 to 0.0100%, Cr: 0 to 1.00%, Ni: 0 to 5.00%, Mo: 0 to 2.000%, Cu: 0 to 1.000%, and Ca: 0 to 0.1000%. Below, these optional elements will be explained in detail.

[Ti: 0 to 0.100%]

Ti is one of the strengthening elements and an element improving the heat resistance of the Al-based plating layer. If the Ti content is less than 0.005%, the effect of improvement of the strength or heat resistance cannot be sufficiently obtained, therefore the Ti content is preferably 0.005% or more. For example, the Ti content may be 0.010% or more or 0.015% or more. On the other hand, if excessively including Ti, for example, carbides and nitrides are formed leading to softening of the steel material, therefore the Ti content is preferably 0.100% or less. For example, the Ti content may be 0.080% or less or 0.050% or less.

[B: 0 to 0.0100%]

B is an element having the effect of acting to improve the strength of the steel material at the time of hardening. If the B content is less than 0.0003%, such an effect of improving the strength is not sufficiently obtained. On the other hand, if more than 0.0100%, inclusions (for example, BN, borocarbides, etc.) are formed resulting in embrittlement and the fatigue strength is liable to be lowered. Therefore, the B content is preferably 0.0003% to 0.0100%. For example, the B content may be 0.0010% or more or 0.0020% or more and/or 0.0080% or less or 0.0060% or less.

[Cr: 0 to 1.00%]

Cr has the effect of suppressing the formation of nitrides formed at the interface of the Al-based plating layer and causing the Al-based plating layer to peel off. Further, Cr is also an element improving the wear resistance and improving the hardenability. If the Cr content is less than 0.01%, these effects cannot be sufficiently obtained. On the other hand, if the Cr content is more than 1.00%, not only do the above effects become saturated, but also the production costs of the steel material rise. Therefore, the Cr content is preferably 0.01 to 1.00%. For example, the Cr content may be 0.05% or more or 0.10% or more and/or 0.80% or less or 0.50% or less.

[Ni: 0 to 5.00%]

Ni has the effect of improving the hardenability at the time of hot pressing and also has the effect of raising the corrosion resistance of the steel material itself. If the Ni content is less than 0.01%, these effects cannot be sufficiently obtained, On the other hand, if the Ni content is more than 5.00%, not only do the above effects become saturated, but also the production costs of the steel material rise. Therefore, the Ni content is preferably 0.01 to 5.00%. For example, the Ni content may be 0.05% or more or 0.10% or more and/or 3.00% or less or 2.00% or less.

[Mo: 0 to 2.000%]

Mo has the effect of improving the hardenability at the time of hot pressing and also has the effect of raising the corrosion resistance of the steel material itself. If the Mo content is less than 0.005%, these effects cannot be sufficiently obtained. On the other hand, if the Mo content is more than 2.000%, not only do the above effects become saturated, but also the production costs of the steel material rise. Therefore, the Mo content is preferably 0.005 to 2.000%. For example, Mo content may be 0.010% or more or 0.100% or more and/or 1.500% or less or 1.000% or less.

[Cu: 0 to 1.000%]

Cu has the effect of improving the hardenability at the time of hot pressing and also has the effect of raising the corrosion resistance of the steel material itself. If the Cu content is less than 0.005%, the above effects cannot be sufficiently obtained, On the other hand, if the Cu content is more than 1.000%, not only do the above effects become saturated, but also the production costs of the steel material rise. Therefore, Cu content is preferably 0.005 to 1.000%. For example, the Cu content may be 0.010% or more or 0.050% or more and/or 0.500% or less or 0.200% or less.

[Ca: 0 to 0.1000%]

Ca is an element for controlling inclusions. If the Ca content is less than 0.0002%, the effect is not sufficiently obtained, therefore the Ca content is preferably 0.0002% or more. For example, the Ca content may be 0.0010% or more or 0.0020% or more. On the other hand, if the Ca content is more than 0.1000%, the alloy cost becomes higher, therefore the Ca content is preferably 0.1000% or less. For example, the Ca content may be 0.0500% or less or 0.0100% or less.

Furthermore, the steel base material according to the Al-plated steel sheet of the present invention may suitably contain other elements in a range not detracting from the effect of the present invention explained in this Description in addition to or in place of the above optional elements. For example, W, V, Nb, Sb, and other elements may be suitably included.

In the steel base material according to the Al-plated steel sheet of the present invention, the balance other than the above constituents consists of Fe and impurities. Here, the impurities in the steel base material are constituents, etc., entering due to various factors in the production process such as the ore, scrap or other raw materials when industrially producing the Al-plated steel sheet according to the present invention.

[Al-Plating Layer]

According to the present invention, an Al-plating layer is formed on at least one side of the steel base material, i.e., on one side or both sides of the steel base material. In the Al-plated steel sheet of the present invention, the "Al-plating layer" means a plating layer in which the chemical composition right after plating mainly consists of Al, more specifically, a plating layer in which the chemical composition right after plating comprises more than 50 mass % of Al. For example, the Al content of the Al-plating layer right after plating may be 60 mass % or more, 70 mass % or more, or 80 mass % or more and 95 mass % or less, 90 mass % or less, or 85 mass % or less.

The Al-plating layer according to the Al-plated steel sheet of the present invention preferably contains Si in 3 mass % or more and 15 mass % or less and has a balance of Al and impurities. For example, the Si content of the Al-plating layer may be 4 mass % or more, 5 mass % or more, or 6 mass % or more and/or 14 mass % or less, 13 mass % or less, or 12 mass % or less, more preferably 6 mass % or more and 12 mass % or less. In the present invention, the chemical composition of the Al-plating layer can be deemed basically the same as the chemical composition in the plating bath for forming the Al-plating layer except for unavoidable impurities entering when forming the Al-plating layer.

Furthermore, the Al-plating layer according to the Al-plating steel sheet of the present invention may also suitably contain other elements in a range not obstructing the effect of the present invention explained in the Description. For example, the Al-plating layer may, in addition to Si, optionally contain Mg, Ca, Sr, mischmetal, or other elements for improving the corrosion resistance of the Al-plating layer.

In the Al-plating layer according to the Al-plated steel sheet of the present invention, the balance other than the above constituents (i.e., Si, Mg, Ca, Sr, mischmetal, and other elements) consists of Al and impurities. Here, the "impurities" in the Al-plating layer are raw materials first and foremost and other constituents, etc., entering due to various factors in the production process when producing an Al-plating layer. For example, as the impurities in the Al-plating layer, Fe and other steel base material constituents eluting from the steel base material to the inside of the plating bath may be mentioned. Such a content of Fe is generally 1 mass % or more, more specifically to 3 mass % or 1 to 2.5 mass %.

[Coating Containing ZnO Particles and $CeO_2$ Particles Having Average Particle Size Smaller Than Average Particle Size of ZnO Particles]

According to the present invention, the Al-plating layer is formed with a coating containing ZnO particles and $CeO_2$ particles having an average particle size smaller than the average particle size of the ZnO particles. The Al-plated steel sheet of the present invention has a structure the same as the structure of FIG. 1 relating to the hot stamped body other than not containing the Zn- and Al-containing complex oxide layer. By applying such an Al-plated steel sheet to the production of a hot stamped body, as explained above in relation to the hot stamped body, even if a defect is formed at the hot stamped body which would reach down to the steel base material, the Ce constituent, more specifically the $Ce^{4+}$ ions, is made to be eluted from the $CeO_2$ particles at the defect part and can form a protective coating at the cathodic reaction region of the exposed part of the steel base material. More specifically, it is possible to form a protective coating comprised of $Ce(OH)_4$, therefore progression of the cathodic reaction at the exposed part of the steel base material can be suppressed. As a result, according to the Al-plated steel sheet of the present invention, it is possible to obtain a hot stamped body remarkably suppressed in occurrence of coating film blisters, etc., and excellent in corrosion resistance after coating.

(Noninclusion of Organic Binder)

The coating according to the Al-plated steel sheet of the present invention preferably does not contain a resin or other organic binder. In a conventional coating including ZnO particles, for example, as the binder constituent for the ZnO particles, sometimes an organic binder selected from a polyurethane resin, epoxy resin, acrylic resin, and polyester resin, a silane coupling agent, etc., is used. However, in a coating including ZnO particles, if further including such an organic binder, under the high temperature at the time of hot stamping, part or all of the carbon forming the organic binder will burn and form carbon monoxide or carbon dioxide whereby at least part of the organic binder will be consumed. Furthermore, at the time of such burning, oxygen is liable to be robbed from part or the majority of the ZnO particles adjoining the organic binder.

Here, if ZnO particles are robbed of oxygen and are reduced to metal Zn, since its boiling point is about 907° C. or relatively low, the metal Zn is liable to partially be consumed at the time of hot stamping at 900° C. or a higher high temperature. In such a case, there is a possibility of the intended form and/or function of the coating including ZnO particles no longer be able to be sufficiently maintained. Therefore, the coating according to the Al-plated steel sheet of the present invention preferably does not contain an organic binder and is more preferably comprised of only ZnO particles and $CeO_2$ particles.

(Structure of Coating)

In the Al-plated steel sheet of the present invention, while hot stamping causes part of the ZnO particles in the coating to melt-bond with each other, etc., the basic structure of the coating does not greatly change before and after the hot stamping. Therefore, according to a preferable embodiment of the Al-plated steel sheet of the present invention, in the same way as explained in relation to FIG. 2, the coating containing ZnO particles and $CeO_2$ particles has a structure where $CeO_2$ particles are deposited around the ZnO particles. By having such a structure, the ZnO particles can be made to aggregate relatively densely to reduce the space between the ZnO particles, therefore it becomes possible to make the elution of Ce from the $CeO_2$ particles deposited around these particles progress relatively slowly. Therefore, such a structure is extremely advantageous from the viewpoint of achieving long term corrosion resistance after coating.

(Amount of Deposition of ZnO in Coating)

The amount of deposition of ZnO in the coating according to the Al-plated steel sheet of the present invention, for reasons similar to explained related to the hot stamped body, is preferably 0.60 $g/m^2$ or more and 13.00 $g/m^2$ or less. For example, the amount of deposition of ZnO in the coating may be 0.70 $g/m^2$ or more, 1.00 $g/m^2$ or more, or 1.20 $g/m^2$ or more and/or 10.00 $g/m^2$ or less, 7.00 $g/m^2$ or less, 6.00 $g/m^2$ or less, 5.00 $g/m^2$ or less, 3.00 $g/m^2$ or less, or 2.00 $g/m^2$ or less. The amount of deposition of ZnO in the coating is more preferably 1.20 $g/m^2$ or more and 10.00 $g/m^2$ or less, most preferably 1.20 $g/m^2$ or more and 5.00 $g/m^2$ or less.

(Content of $CeO_2$ Particles in Coating)

The content of $CeO_2$ particles in the coating according to the Al-plated steel sheet of the present invention is preferably, for reasons similar to explained related to the hot stamped body, 1.0 mass % or more and 30.0 mass % or less with respect to the total amount of the ZnO particles and $CeO_2$ particles. For example, the content of $CeO_2$ particles in the coating may be 2.0 mass % or more, 3.0 mass % or more, 4.0 mass % or more, 5.0 mass % or more, or 6.0 mass % or more and/or 25.0 mass % or less, 20.0 mass % or less, 17.0 mass % or less, or 15.0 mass % or less with respect to the total amount of the ZnO particles and $CeO_2$ particles. For example, from the viewpoint of reliably maintaining the effect due to the ZnO particles while achieving to the maximum the long term corrosion resistance after coating, the content of $CeO_2$ particles in the coating is more preferably 2.0 mass % or more and 25.0 mass % or less, most preferably 5.0 mass % or more or 6.0 mass % or more and 15.0 mass % or less, with respect to the total amount of the ZnO particles and $CeO_2$ particles.

The amount of deposition of ZnO in the coating and the content of $CeO_2$ particles with respect to the total amount of the ZnO particles and $CeO_2$ particles according to the Al-plated steel sheet of the present invention are determined in the following way. Specifically, if the aqueous solution or other solution coated on the surface of the Al-plating layer at the time of formation of the coating contains only ZnO particles and $CeO_2$ particles as coating constituents and the mixing ratio of the same is known, the amount of deposition of ZnO in the coating and the content of $CeO_2$ particles with respect to the total amount of the ZnO particles and $CeO_2$ particles are determined from the mixing ratio and the thickness of the coating formed. On the other hand, if the mixing ratio of the ZnO particles and $CeO_2$ particles in the solution is unknown, the amount of deposition of ZnO in the coating and the content of $CeO_2$ particles with respect to the total amount of the ZnO particles and $CeO_2$ particles are determined by analyzing the coating according to the Al-plated steel sheet of the present invention using fluorescent X-ray analysis based on JIS G 3314: 2011. More particularly, first, fluorescent X-ray analysis is used to measure the amounts of deposition of metal Zn and metal Ce in the coating, then these measurement values are converted to the amounts of deposition of ZnO and $CeO_2$ to thereby determine the amount of deposition of ZnO and the amount of deposition of $CeO_2$ in the coating. The content of $CeO_2$ particles is determined from the ratio of the amount of deposition of $CeO_2$ to the total of these amounts of deposition.

(Average Particle Sizes of ZnO Particles and $CeO_2$ Particles)

In the Al-plated steel sheet of the present invention, due to reasons similar to those explained in relation to the hot stamped body, preferably the average particle size of the ZnO particles is 0.003 µm or more and 8.000 µm or less and the average particle size of the $CeO_2$ particles is 3.0% or more and 20.0% or less of the average particle size of the ZnO particles. For example, the average particle size of the ZnO particles may be 0.005 µm or more, 0.008 µm or more, 0.010 µm or more, 0.030 µm or more, 0.050 µm or more, 0.080 µm or more, 0.100 µm or more, 0.500 µm or more, or 0.600 µm or more and/or 7.000 µm or less, 6.000 µm or less, 5.000 µm or less, 4.000 µm or less, 3.000 µm or less, 1.000 µm or less, 0.900 µm or less, or 0.800 µm or less. Similarly, the average particle size of the $CeO_2$ particles may be 4.0% or more, 5.0% or more, 6.0% or more, 8.0% or more, 8.5% or more, 9.0% or more, or 9.5% or more and/or 18.0% or less, 16.0% or less, 14.0% or less, 12.5% or less, 12.0% or less, 11.0% or less, or 10.5% or less of the average particle size of the ZnO particles. The average particle size of the ZnO particles is more preferably 0.050 µm or more and 4.000 µm or less or 3.000 µm or less, most preferably 0.050 µm or more and 0.900 µm or less. Similarly, the average particle size of the $CeO_2$ particles is more preferably 9.0% or more and 12.0% or less, most preferably 9.5% or more and 10.5% or less, of the average particle size of the ZnO particles.

In the present invention, the average particle size of the ZnO particles was determined by using a scan electron microscope (SEM) or other electron microscope to examine the surface of the coating of the Al-plated steel material in a 4 µm×3 µm field (corresponding to 30,000× power) for any two or more locations, selecting 10 or more primary particles (ZnO) for each field and measuring their diameters, and arithmetically averaging the obtained measurement values. However, for example, if the primary particles (ZnO) are large, if not possible to measure the diameters of 10 or more primary particles in a 4 µm×3 µm field, similarly it was determined by examining the surface of the coating of the hot stamped body in a 12 µm×9 µm field (corresponding to 10,000× power) for any two or more locations, selecting 10 or more primary particles (ZnO) for each field and measuring their diameters, and arithmetically averaging the obtained measurement values. Furthermore, if not possible to measure the diameters of 10 or more primary particles in a 12 µm×9 µm fields, similarly it is determined by examining the surface of the coating of the steel material at a 36 µm×27 µm field (corresponding to 3,300× power) for any two or more locations, selecting 10 or more primary particles (ZnO) for each field and measuring their diameters, and arithmetically averaging the obtained measurement values. Regarding the average particle size of the $CeO_2$ particles as well, in the same way as the case of ZnO particles, this was determined by using a SEM or other electron microscope to examine the surface of the coating of the hot stamped body at a 4 µm×3 µm field (corresponding to 30,000× power) for any two or more locations, selecting 10 or more particles deposited around the ZnO particles for each field, analyzing these particles by an energy dispersive X-ray spectrograph (EDS) to confirm the presence of Ce and thereby identify $CeO_2$, then measuring their diameters and arithmetically averaging the obtained measurement values.

In the Al-plated steel sheet of the present invention, heating under a high temperature relating to hot pressing is not performed, therefore part of the ZnO particles in the coating do not melt-bond with each other. For this reason, the ZnO particles and $CeO_2$ particles are present in the coating in the state such as shown in FIG. 3(a). Therefore, in the Al-plated steel sheet of the present invention, at the time of measurement of the average particle size of the ZnO particles and the $CeO_2$ particles by the method explained above, if, as shown in FIG. 3(a), a particle is spherical or substantially spherical, the diameter of the particle is simply measured. On the other hand, if a particle is spheroidal or otherwise not spherical, the longest axis of the particle (long axis) and the shortest axis of the particle perpendicular to the same (short axis) are measured and the arithmetic average is made the particle size of the particle.

Below, examples will be used to explain the present invention in more detail, but the present invention is not limited to these examples in any way.

EXAMPLES

In the following examples, steel materials for the hot stamped body according to the present invention were produced under various conditions and were examined for their corrosion resistance after coating.

First, in each example, cold-rolled steel sheet (sheet thickness 1.4 mm) having a chemical composition comprising, by mass %, C: 0.22%, Si: 0.12%, Mn: 1.25%, P: 0.010%, S: 0.005%, Al: 0.040%, N: 0.001%, Ti: 0.020%, B: 0.0030%, and a balance of Fe and impurities was formed on its two sides with Al-plating layers by the Sendzimir process. More specifically, first, the above cold-rolled steel sheet was annealed in an $N_2$—$H_2$ mixed gas ($H_2$ 4%, $N_2$ balance) atmosphere at 800° C. for 1 minute, then was cooled down to the vicinity of the plating bath temperature in a nitrogen atmosphere. Next, this steel sheet was dipped in an Al plating bath containing 9 mass % of Si at a temperature of 670° C. for 3 seconds, then was pulled out and immediately blown with $N_2$ gas by the gas wiping method to adjust the amounts of deposition of Al plating on the two sides to 160 g/m² (single side 80 g/m²). Next, the steel sheet was blown with air to cool it and thereby form an Al-plating layer on the two sides of the steel sheet.

Next, the cooled Al-plating layer was coated with an aqueous solution containing ZnO particles and $CeO_2$ particles in the mixing ratio shown in Table 1 by a bar coater. The wet film thickness was adjusted to give the amount of deposition of ZnO shown in Table 1. Next, the steel sheet was heated at a peak temperature of 80° C. to thereby bake a coating containing ZnO particles and $CeO_2$ particles on the Al-plating layer. This was cooled, then the obtained steel sheet was cut to 120 mm×200 mm in size. The amounts of deposition and mixing ratio of ZnO and $CeO_2$ shown in Table 1 were those calculated from the mixing ratio of the ZnO particles and $CeO_2$ particles in the aqueous solution coated on the surface of the Al-plating layer and the thickness of the coating, but these values were equivalent to the measurement values determined for the steel material corresponding to the finally obtained hot stamped body by fluorescent X-ray analysis based on JIS G 3314: 2011.

TABLE 1

| | Coating | | | | | | | | | |
|---|---|---|---|---|---|---|---|---|---|---|
| | Amount of deposition (g/m²) | | Mixing ratio (mass %) | | Average particle size (μm) | | | Coating film blister width | | |
| No. | ZnO | CeO₂ | ZnO | CeO₂ | A ZnO | B CeO₂ | B/A (%) | (mm) | Evaluation | Remarks |
| 1 | 0.37 | 0.041 | 90 | 10 | 0.8 | 0.08 | 10.0 | 5.10 | Fair | Ex. |
| 2 | 0.58 | 0.064 | 90 | 10 | 0.8 | 0.08 | 10.0 | 5.03 | Fair | Ex. |
| 3 | 0.62 | 0.069 | 90 | 10 | 0.8 | 0.08 | 10.0 | 5.00 | Fair | Ex. |
| 4 | 1.00 | 0.111 | 90 | 10 | 0.8 | 0.08 | 10.0 | 4.90 | Fair | Ex. |
| 5 | 1.24 | 0.006 | 99.5 | 0.5 | 0.8 | 0.08 | 10.0 | 5.10 | Fair | Ex. |
| 6 | 1.24 | 0.010 | 99.2 | 0.8 | 0.8 | 0.08 | 10.0 | 4.95 | Fair | Ex. |
| 7 | 1.24 | 0.013 | 99 | 1 | 0.8 | 0.08 | 10.0 | 4.90 | Fair | Ex. |
| 8 | 1.24 | 0.025 | 98 | 2 | 0.8 | 0.08 | 10.0 | 4.80 | Good | Ex. |
| 9 | 1.24 | 0.052 | 96 | 4 | 0.8 | 0.08 | 10.0 | 4.10 | Good | Ex. |
| 10 | 1.24 | 0.079 | 94 | 6 | 0.8 | 0.08 | 10.0 | 3.60 | Very good | Ex. |
| 11 | 1.24 | 0.108 | 92 | 8 | 0.8 | 0.08 | 10.0 | 3.40 | Very good | Ex. |
| 12 | 1.24 | 0.138 | 90 | 10 | 0.8 | 0.08 | 10.0 | 3.20 | Very good | Ex. |
| 13 | 1.24 | 0.170 | 88 | 12 | 0.8 | 0.08 | 10.0 | 3.40 | Very good | Ex. |
| 14 | 1.24 | 0.220 | 85 | 15 | 0.8 | 0.08 | 10.0 | 3.70 | Very good | Ex. |
| 15 | 1.24 | 0.311 | 80 | 20 | 0.8 | 0.08 | 10.0 | 4.00 | Good | Ex. |
| 16 | 1.24 | 0.415 | 75 | 25 | 0.8 | 0.08 | 10.0 | 4.30 | Good | Ex. |
| 17 | 1.24 | 0.533 | 70 | 30 | 0.8 | 0.08 | 10.0 | 4.90 | Fair | Ex. |
| 18 | 1.24 | 0.670 | 65 | 35 | 0.8 | 0.08 | 10.0 | 5.10 | Fair | Ex. |
| 19 | 1.24 | 0.584 | 63 | 32 | 0.8 | 0.08 | 10.0 | 4.95 | Fair | Ex. |
| 20 | 6.22 | 0.692 | 90 | 10 | 0.8 | 0.08 | 10.0 | 4.20 | Good | Ex. |
| 21 | 9.96 | 1.106 | 90 | 10 | 0.8 | 0.08 | 10.0 | 4.50 | Good | Ex. |
| 22 | 12.4 | 1.383 | 90 | 10 | 0.8 | 0.08 | 10.0 | 5.00 | Fair | Ex. |
| 23 | 13.2 | 1.467 | 90 | 10 | 0.8 | 0.08 | 10.0 | 5.07 | Fair | Ex. |
| 24 | 16.2 | 1.798 | 90 | 10 | 0.8 | 0.08 | 10.0 | 5.20 | Fair | Ex. |
| 25 | 1.24 | 0.138 | 90 | 10 | 0.08 | 0.0056 | 7.0 | 5.10 | Fair | Ex. |
| 26 | 1.24 | 0.138 | 90 | 10 | 0.8 | 0.056 | 7.0 | 5.20 | Fair | Ex. |
| 27 | 1.24 | 0.138 | 90 | 10 | 0.8 | 0.062 | 7.8 | 5.10 | Fair | Ex. |
| 28 | 1.24 | 0.138 | 90 | 10 | 0.8 | 0.064 | 8.0 | 5.05 | Fair | Ex. |
| 29 | 1.24 | 0.138 | 90 | 10 | 0.8 | 0.068 | 8.5 | 5.00 | Fair | Ex. |
| 30 | 1.24 | 0.138 | 90 | 10 | 0.8 | 0.072 | 9.0 | 4.30 | Good | Ex. |
| 31 | 1.24 | 0.138 | 90 | 10 | 0.08 | 0.0072 | 9.0 | 4.80 | Good | Ex. |
| 32 | 1.24 | 0.138 | 90 | 10 | 0.8 | 0.088 | 11.0 | 4.10 | Good | Ex. |
| 33 | 1.24 | 0.138 | 90 | 10 | 0.8 | 0.1 | 12.5 | 5.00 | Fair | Ex. |
| 34 | 1.24 | 0.138 | 90 | 10 | 0.8 | 0.104 | 13.0 | 5.10 | Fair | Ex. |
| 35 | 1.24 | 0.138 | 90 | 10 | 0.08 | 0.0088 | 11.0 | 4.50 | Good | Ex. |
| 36 | 1.24 | 0.138 | 90 | 10 | 0.08 | 0.0104 | 13.0 | 5.20 | Fair | Ex. |
| 37 | 1.24 | 0.138 | 90 | 10 | 0.005 | 0.0005 | 10.0 | 5.10 | Fair | Ex. |
| 38 | 1.24 | 0.138 | 90 | 10 | 0.007 | 0.0007 | 10.0 | 5.06 | Fair | Ex. |
| 39 | 1.24 | 0.138 | 90 | 10 | 0.01 | 0.001 | 10.0 | 5.00 | Fair | Ex. |
| 40 | 1.24 | 0.138 | 90 | 10 | 1 | 0.1 | 10.0 | 4.00 | Good | Ex. |
| 41 | 1.24 | 0.138 | 90 | 10 | 3 | 0.3 | 10.0 | 4.40 | Good | Ex. |
| 42 | 1.24 | 0.138 | 90 | 10 | 5 | 0.5 | 10.0 | 5.00 | Fair | Ex. |
| 43 | 1.24 | 0.138 | 90 | 10 | 6 | 0.6 | 10.0 | 5.05 | Fair | Ex. |
| 44 | 1.24 | 0.138 | 90 | 10 | 7 | 0.7 | 10.0 | 5.10 | Fair | Ex. |
| 45 | 1.24 | 0.000 | 100 | 0 | 0.08 | — | — | 5.30 | Poor | Comp. ex. |

Next, the steel sheet was loaded into a furnace simulating hot stamping and was set on a 70 mm×70 mm SiC table with the evaluated surface facing upward. Next, this was set on a 50 mm×50 mm×70 mm SUS304 block heated to 900° C. and was heated in that state for 1 minute. Finally, the steel sheet was taken out from the furnace, then was immediately clamped by a stainless steel die and rapidly cooled by an approximately 150° C./s cooling rate to obtain a steel material corresponding to the hot stamped body according to the present invention. Each obtained steel material was measured for the average particle sizes of the ZnO particles and the CeO₂ particles in the coating and further were tested for the corrosion resistance after coating explained below.

[Measurement of Average Particle Sizes of ZnO Particles and CeO₂ Particles]

The average particle size of the ZnO particles was determined by using an SEM to examine the surface of the coating of the steel material at a 4 μm×3 μm field (corresponding to 30,000× power) for any two locations, selecting 10 primary particles (ZnO) for each field and measuring their diameters, and arithmetically averaging the obtained measurement values. Further, if not possible to measure the diameters of 10 or more primary particles in a 4 μm×3 μm field, similarly it was determined by examining the surface of the coating of the steel material at a 12 μm×9 μm field (corresponding to 10,000× power) for any two or more locations, selecting 10 or more primary particles (ZnO) for each field and measuring their diameters, and arithmetically averaging the obtained measurement values. Furthermore, if not possible to measure the diameters of 10 or more primary particles in a 12 μm×9 μm field, similarly it is determined by examining the surface of the coating of the steel material at a 36 μm×27 μm field (corresponding to 3,300× power) for any two or more locations, selecting 10 or more primary particles (ZnO) for each field and measuring their diameters, and arithmetically averaging the obtained measurement values. On the other hand, the average particle size of the CeO₂ particles was determined by using a scan electron microscope with an energy dispersive X-ray spectrometer (SEM-EDS) to examine the surface of the coating of the steel material at a 4 μm×3 μm field (corresponding to 30,000× power) for any two or more locations, selecting 10 particles deposited around the ZnO particles for each field, analyzing these particles by EDS to confirm the presence of Ce and thereby identify $CeO_2$, then measuring their diameters and arithmetically averaging the obtained measurement values. The Al-plated steel sheet before heating at 900° C. was similarly measured for the average particle sizes of the ZnO particles and the $CeO_2$ particles, but these values were equal to the average particle sizes of the ZnO particles and the $CeO_2$ particles after heating at 900° C. and rapid cooling by about 150° C./s shown in Table 1.

[Test of Corrosion Resistance After Coating]

The end parts of each obtained steel material were cut off to obtain from the center part a sample of 70 mm×150 mm size. The sample was chemically converted by a chemical conversion solution (PB-SX35 made by Nihon Parkerizing Co., Ltd.), then was coated with an electrodeposition coating (Powernix 110 made by Nippon Paint) to a film thickness of 15 μm and baked at 170° C. Next, the coating film was given a cut (defect) by an acrylic cutter and it was confirmed the cut reached the steel base. The steel material was measured for the width of the coating film blister (maximum value at one side) from the cut part after 122 cycles in the SAE J2334 test. The results are shown in Table 1. Here, the smaller the value of the "coating blister width" in Table 1, the better the corrosion resistance after coating of the steel material that is meant. In Table 1, as a comparative example, the test results of a steel material provided with a coating not containing $CeO_2$ particles but comprised of only ZnO particles are also shown (Comparative Example 45 in Table 1). Further, the coating blister width was scored as follows:

Very good: coating blister width less than 4.00 mm
Good: coating blister width 4.00 mm or more and less than 4.90 mm
Fair: coating blister width 4.90 mm or more and less than 5.25 mm
Poor: coating blister width 5.25 mm or more Referring to Table 1, in the steel material of Comparative Example 45 provided with a coating not containing $CeO_2$ particles but comprised of only ZnO particles, the coating blister width was 5.30 mm, while in the steel materials according to all of the other examples, smaller coating blister widths, specifically less than 5.25 mm coating blister widths, can be achieved. For this reason, by including in the coating $CeO_2$ particles having an average particle size smaller than the average particle size of the ZnO particles, it was possible to improve the corrosion resistance after coating. Further, as clear from the results of Table 1, by suitably controlling the amount of deposition of ZnO in the coating, the $CeO_2$ particle content in the coating, and the average particle sizes of the ZnO particles and the $CeO_2$ particles, it was possible to further reduce the coating blister width.

More specifically, by controlling the amount of deposition of ZnO in the coating to 1.20 $g/m^2$ or more and 10.00 $g/m^2$ or less, the content of $CeO_2$ particles in the coating to 2.0 mass % or more and 25.0 mass % or less, the average particle size of the ZnO particles to 0.050 μm or more and 4.000 μm or less, and the average particle size of the $CeO_2$ particles to 9.0% or more and 12.0% or less of the average particle size of the ZnO particles, it was possible to reduce the coating blister width to less than 4.90 mm (see Examples 8 to 16, 20, 21, 30 to 32, 35, 40, and 41 evaluated as "very good" and "good"). In particular, in the steel materials of Examples 10 to 14, by controlling the amount of deposition of ZnO in the coating to 1.20 $g/m^2$ or more and 5.00 $g/m^2$ or less, the content of $CeO_2$ particles in the coating to 5.0 mass % or more and 15.0 mass % or less, the average particle size of the ZnO particles to 0.050 μm or more and 0.900 μm or less, and the average particle size of the $CeO_2$ particles to 9.5% or more and 10.5% or less of the average particle size of the ZnO particles, it was possible to reduce the coating blister width to 3.20 to 3.70 mm (corresponding to evaluation as "very good"). It is believed such results are related to the structure of the coating shown in FIGS. 2B and 2C, i.e., the structure where $CeO_2$ particles are deposited around ZnO particles. Further, while not shown in Table 1, from the image of the cross-section observed by an SEM and other analysis, it was confirmed that in the steel materials of all of the examples, there was a Zn- and Al-containing complex oxide layer present between the Al-plating layer and the coating containing ZnO particles and $CeO_2$ particles and that this was a layer comprised of spinel type complex metal oxides represented by $ZnAl_2O_4$ in which some of the elements are replaced or not replaced by Ce.

REFERENCE SIGNS LIST 1. steel base material
2. Al-plating layer
3. coating containing ZnO particles and $CeO_2$ particles
4. ZnO particles
5. $CeO_2$ particles
6. Zn- and Al-containing complex oxide layer
10. hot stamped body

The invention claimed is:
1. A hot stamped body comprising
   a steel base material,
   an Al-plating layer formed on at least one surface of the steel base material,
   a coating formed on the Al-plating layer and containing ZnO particles and $CeO_2$ particles having an average particle size smaller than an average particle size of the ZnO particles, and
   a Zn- and Al-containing complex oxide layer formed between the Al-plating layer and the coating.
2. The hot stamped body according to claim 1, wherein the coating does not contain an organic binder.
3. The hot stamped body according to claim 1, wherein the coating has a structure in which the $CeO_2$ particles are deposited around the ZnO particles.
4. The hot stamped body according to claim 1, wherein an amount of deposition of ZnO in the coating is 0.60 $g/m^2$ or more and 13.00 $g/m^2$ or less.
5. The hot stamped body according to claim 4, wherein the amount of deposition of ZnO in the coating is 1.20 $g/m^2$ or more and 10.00 $g/m^2$ or less.
6. The hot stamped body according to claim 1, wherein the coating contains the $CeO_2$ particles in 1.0 mass % or more and 30.0 mass % or less with respect to a total amount of the ZnO particles and the $CeO_2$ particles.
7. The hot stamped body according to claim 6, wherein the coating contains the $CeO_2$ particles in 2.0 mass % or more and 25.0 mass % or less with respect to the total amount of the ZnO particles and the $CeO_2$ particles.
8. The hot stamped body according to claim 1, wherein an average particle size of the ZnO particles is 0.003 μm or more and 8.000 μm or less and an average particle size of the $CeO_2$ particles is 3.0% or more and 20.0% or less of the average particle size of the ZnO particles.

9. The hot stamped body according to claim 8, wherein the average particle size of the ZnO particles is 0.010 µm or more and 5.000 µm or less and the average particle size of the $CeO_2$ particles is 8.0% or more and 12.5% or less of the average particle size of the ZnO particles.

10. The hot stamped body according to claim 9, wherein the average particle size of the ZnO particles is 0.050 µm or more and 4.000 µm or less and the average particle size of the $CeO_2$ particles is 9.0% or more and 12.0% or less of the average particle size of the ZnO particles.

11. The hot stamped body according to claim 1, wherein the steel base material comprises, by mass %,
C: 0.01 to 0.50%,
Si: 2.00% or less,
Mn: 0.01 to 3.50%,
P: 0.100% or less,
S: 0.050% or less,
Al: 0.001 to 0.100%,
N: 0.020% or less,
Ti: 0 to 0.100%,
B: 0 to 0.0100%,
Cr: 0 to 1.00%,
Ni: 0 to 5.00%,
Mo: 0 to 2.000%,
Cu: 0 to 1.000%,
Ca: 0 to 0.1000%, and
a balance of Fe and impurities.

12. The hot stamped body according to claim 1, wherein the Al-plating layer comprises Si and a balance of Al, Fe and impurities.

13. A method for producing a hot stamped body according to claim 1, comprising
forming an Al-plating layer on at least one side of a steel sheet,
coating a surface of the Al-plating layer with an aqueous solution containing ZnO particles and $CeO_2$ particles, then heating it to form a coating containing ZnO particles and $CeO_2$ particles on the Al-plating layer, and
hot pressing the steel sheet having the formed coating thereon.

14. An Al-plated steel sheet comprising
a steel base material,
an Al-plating layer formed on at least one surface of the steel base material, and
a coating formed on the Al-plating layer and containing ZnO particles and $CeO_2$ particles having an average particle size smaller than an average particle size of the ZnO particles.

15. The Al-plated steel sheet according to claim 14, wherein the coating does not contain an organic binder.

16. The Al-plated steel sheet according to claim 14, wherein the coating has a structure in which the $CeO_2$ particles are deposited around the ZnO particles.

* * * * *